(12) United States Patent
Edwards et al.

(10) Patent No.: US 12,198,199 B2
(45) Date of Patent: *Jan. 14, 2025

(54) SEGMENTATION AND LOAD BALANCING

(71) Applicant: Hartford Fire Insurance Company, Hartford, CT (US)

(72) Inventors: Paul J. Edwards, West Hartford, CT (US); Keren Shemesh, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,749

(22) Filed: Jul. 10, 2023

(65) Prior Publication Data

US 2023/0351521 A1 Nov. 2, 2023

Related U.S. Application Data

(63) Continuation of application No. 17/390,779, filed on Jul. 30, 2021, now Pat. No. 11,699,192, which is a continuation of application No. 16/284,286, filed on Feb. 25, 2019, now Pat. No. 11,080,791, which is a continuation of application No. 14/530,063, filed on Oct. 31, 2014, now Pat. No. 10,217,170.

(60) Provisional application No. 62/046,348, filed on Sep. 5, 2014.

(51) Int. Cl.
*G06Q 40/08* (2012.01)
*G06Q 10/0631* (2023.01)

(52) U.S. Cl.
CPC ..... *G06Q 40/08* (2013.01); *G06Q 10/063116* (2013.01)

(58) Field of Classification Search
None
See application file for complete search history.

(56) References Cited

U.S. PATENT DOCUMENTS

| | | |
|---|---|---|
| 5,727,950 A | 3/1998 | Cook |
| 5,950,169 A | 9/1999 | Borghesi et al. |
| 5,991,733 A | 11/1999 | Aleia |
| 6,049,773 A | 4/2000 | McCormack |
| 6,604,080 B1 | 8/2003 | Kern |
| 6,606,740 B1 | 8/2003 | Lynn |
| 7,203,654 B2 | 4/2007 | Menendez |

(Continued)

OTHER PUBLICATIONS

A hybrid load balancing model for multi-agent systems IEEE 2011 (Year: 2011).*

(Continued)

*Primary Examiner* — Bruce I Ebersman
(74) *Attorney, Agent, or Firm* — Howard IP Law Group, PC

(57) ABSTRACT

According to some embodiments, data may be received indicative of a plurality of insurance claims along with an indication of an appropriate claim segment classification for each insurance claim. A first claim handler may then be automatically selected for a first insurance claim based at least in part on: (i) a first segment classification associated with the first insurance claim, (ii) numbers of other insurance claims currently assigned to claim handlers, and (iii) load factors associated with claim handlers. An indication of the selected first claim handler may then be transmitted.

15 Claims, 27 Drawing Sheets

(56) References Cited

U.S. PATENT DOCUMENTS

| | | | |
|---|---|---|---|
| 7,383,217 B2 | 6/2008 | Calderaro | |
| 7,398,218 B1 | 7/2008 | Bernaski et al. | |
| 7,809,601 B2 | 10/2010 | Shaya | |
| 7,813,944 B1 | 10/2010 | Luk | |
| 7,877,279 B1 | 1/2011 | Sturgis et al. | |
| 7,945,497 B2 | 5/2011 | Kenefick et al. | |
| 7,953,615 B2 | 5/2011 | Aquila et al. | |
| 7,957,986 B1* | 6/2011 | Hail | G06Q 10/10 705/3 |
| 8,046,281 B1* | 10/2011 | Urrutia | G06Q 10/06 705/7.17 |
| 8,125,142 B2 | 2/2012 | Sung et al. | |
| 8,126,742 B2 | 2/2012 | Bond et al. | |
| 8,165,282 B1 | 4/2012 | Coughlan et al. | |
| 8,539,370 B2 | 9/2013 | Albert et al. | |
| 8,577,823 B1 | 11/2013 | Gadir | |
| 8,650,043 B1 | 2/2014 | Phillips | |
| 8,762,180 B2* | 6/2014 | Ghani | G06N 20/00 705/4 |
| 8,767,948 B1 | 7/2014 | Riahi et al. | |
| 8,825,504 B2 | 9/2014 | Tholl et al. | |
| 9,269,069 B2 | 2/2016 | Chen et al. | |
| 9,473,639 B2 | 10/2016 | McCormack et al. | |
| 9,589,210 B1 | 3/2017 | Estrada et al. | |
| 9,646,081 B1 | 5/2017 | Volchegursky et al. | |
| 9,654,638 B2 | 5/2017 | Waxman et al. | |
| 9,984,421 B2 | 5/2018 | Blakeman et al. | |
| 2002/0055862 A1 | 5/2002 | Jinks | |
| 2002/0194033 A1 | 12/2002 | Huff | |
| 2003/0023728 A1 | 1/2003 | Yaung | |
| 2006/0053035 A1 | 3/2006 | Eisenberg | |
| 2006/0212337 A1 | 9/2006 | Vayghan et al. | |
| 2007/0226018 A1 | 9/2007 | Gross et al. | |
| 2008/0004915 A1 | 1/2008 | Brown | |
| 2008/0015968 A1 | 1/2008 | Van Luchene et al. | |
| 2008/0021794 A1 | 1/2008 | Vega | |
| 2008/0147448 A1 | 6/2008 | McLaughlin et al. | |
| 2008/0249820 A1 | 10/2008 | Pathria et al. | |
| 2009/0119133 A1 | 5/2009 | Yeransian et al. | |
| 2009/0265193 A1 | 10/2009 | Collins et al. | |
| 2010/0010885 A1 | 1/2010 | Hill et al. | |
| 2010/0049544 A1 | 2/2010 | Ambrose | |
| 2010/0287131 A1* | 11/2010 | Church | G06Q 10/00 706/47 |
| 2012/0046975 A1 | 2/2012 | Stolze | |
| 2013/0185433 A1 | 7/2013 | Zhu et al. | |
| 2013/0332403 A1 | 12/2013 | Paramashivappa et al. | |
| 2014/0033223 A1 | 1/2014 | Swart et al. | |
| 2014/0330594 A1 | 11/2014 | Roberts et al. | |
| 2014/0358591 A1* | 12/2014 | Gray | G06Q 40/08 705/4 |
| 2015/0025917 A1 | 1/2015 | Stempora | |
| 2015/0106129 A1* | 4/2015 | Kinney | G06Q 40/08 705/4 |
| 2015/0154713 A1 | 6/2015 | Diaz et al. | |
| 2015/0381649 A1* | 12/2015 | Schultz | G06Q 10/0635 726/25 |
| 2016/0071217 A1* | 3/2016 | Edwards | G06Q 40/08 705/4 |
| 2016/0314253 A1* | 10/2016 | Incze | G06Q 40/08 |
| 2018/0253798 A1* | 9/2018 | Blakeman | G06Q 10/063116 |
| 2020/0327618 A1* | 10/2020 | Blakeman | G06Q 10/063116 |
| 2021/0174455 A1* | 6/2021 | Incze | G06Q 40/08 |
| 2023/0351521 A1* | 11/2023 | Edwards | G06Q 10/063116 |

OTHER PUBLICATIONS

Personal Financial Market Segmentation Based on Clustering Ensembles, IEEE 2009 (Year: 2009).*

J.D. Power and Associates Reports: American Family Insurance Agents Recognized for Customer Excellence; Jul. 25, 2005. Business Wire; retrieved from https://dialog.proquest.com/professional/docview/674061229? accountid=142257 (Year 2005).

Snook, R. (2007). Serious claims—a contest of equals? Insurance Brokers' Monthly, 57(5), 20. Retrieved from https://dialog.proquest.com/professional/docview/200954091 ?accountid=131444 on Feb. 9, 2023 (Year: 2007).

Geisel, R. W. (2008). Predictive models tackle drivers of workers comp claims. Business Insurance, 42(42), 19-20. Retrieved from https://dialog .proquest.com/professional/docview/233519781?accountid=131444 on Mar. 18, 2021 (Year: 2008).

Cacchione, T. (2006). Advanced analytics make for smarter claims decisions improve bottom line: Decision support tools, dynamic predictive models help create total cost focus. National Underwriter Property & Casualty-Risk & Benefits Management, 110(13), 26(2), Retrieved from https://dialog.proquest.com/professional/docview/676723022?accountid=131444 on Mar. 18, 2021 (Year: 2006).

* cited by examiner

| CLAIM IDENTIFIER 802 | INSURANCE TYPE 804 | JURISDICTION 806 | CAUSE OF INJURY 808 | AMOUNT OF TIME EMPLOYEE WILL MISS FROM WORK 810 | SEGMENT 812 |
|---|---|---|---|---|---|
| C_100001 | WORKERS' COMPENSATION | NY | COI_103 | NONE | BASIC |
| C_100002 | WORKERS' COMPENSATION | CT | COI_101 | 2 WEEKS | INTERMEDIATE |
| C_100003 | WORKERS' COMPENSATION | MI | COI_101 | 4 MONTHS | HIGH EXPOSURE |
| C_100004 | HOMEOWNERS LIABILITY | FL | NONE | NA | HIGH |
| C_100005 | PERSONAL PROPERTY | CA | NONE | NA | SPECIALIZED |

*FIG. 8*

| CAUSE OF INJURY IDENTIFIER 902 | CAUSE OF INJURY 904 | EXCLUDE NEW EE 906 | CLAIM DESCRIPTION 908 |
|---|---|---|---|
| COI_101 | BURN OR SCALD - HEAT OR COLD EXPOSURE | NO | ABSORPTION - CAUSTIC/NOXIOUS/TOXIC SUBSTANCE |
| COI_102 | CUT, PUNCTURE, SCRAPE | NO | STRUCK AGAINST MOVING OBJECT |
| COI_103 | FALL, SLIP OR TRIP INJURY | NO | SLIP OR FALL ON STAIR/ESCALATOR/ELEVATOR |
| COI_104 | STRAIN OR INJURY BY | YES | ACUTE TRAUMA - HANDLING/THROWING OBJECT |
| COI_105 | MOTOR VEHICLE | NO | VEHICLE ACCIDENT - CONVEYANCE/PUBLIC TRANSPORTATION |

| RULE IDENTIFIER 1302 | RULE 1304 |
|---|---|
| R_001 | IF WORKERS' COMPENSATION CLAIM TYPE IS "LONGSHORE," SEGMENT = "SPECIALIZED" |
| R_002 | IF WORKERS' COMPENSATION CLAIM IS ASSOCIATED WITH LOST TIME, MINIMUM SEGMENT = "CORE" |
| R_003 | IF HOSPITALIZED IN BURN UNIT, SEGMENT = "HIGH EXPOSURE" |
| R_004 | IF IDENTIFIED AS HIGH OR LOW BMI CO-MORBIDITY PRESENT, SEGMENT = "SPECIALIZED" |

| CLAIM HANDLER IDENTIFIER 1702 | CONTACT 1704 | LOAD FACTOR 1706 | CURRENT CLAIMS 1708 | UPCOMING PAID TIME OFF 1710 | REQUEST MORE 1712 |
|---|---|---|---|---|---|
| H_101 | (123) 555-5555 | 100% | 30 | NONE | YES |
| H_102 | JANE@INSURANCECO.COM | 80% | 25 | NONE | NO |
| H_103 | (123) 555-5555 | 110% | 5 | MAY 15 TO 20, 2018 | NO |
| H_104 | 1234.1234.1234.1234 | 125% | 45 | NONE | YES |
| H_105 | (456) 555-5555 | 90% | 21 | MAY 18, 2018 (½ DAY) | NO |

INSURANCE CLAIM PROCESSING SYSTEM: ASSIGNMENT PREFERENCES TABLE

ASSIGNMENT PREFERENCES TABLE

LINE OF BUSINESS TYPE: AUTO

| OFFICE | SEGMENT | MONDAY OVERFLOWW | STANDARD OVERFLOW | OVERFLOW SEGMENT | OVERFLOW QUEUE | DIRCT ASSGN QUEUE | NIGHT QUEUE | EXCEPTION QUEUE |
|---|---|---|---|---|---|---|---|---|
| CENTRAL AUTO | LARGE LOSS | | | | | AUTO A | | EXCEPTION 1 |
| CENTRAL AUTO | LIT | | | | | LIT A | | EXCEPTION 2 |
| CENTRAL AUTO | CAS 3 | | | | | EXCEPTION 1 | | CAS EXCEPTION |
| MIDWEST | CAS 2 | | | | | | | CAS EXCEPTION |
| MIDWEST | CAS 1 | | | | | | | CAS EXCEPTION |

DEFAULT VALUES    SAVE

*FIG. 20*

CATASTROPHE MANAGEMENT TABLE

| STATUS | CATASTROPHE NAME | IDENTIFIER | BEGIN DATE | END DATE |
|---|---|---|---|---|
| ACTIVE | CAT 01 WINTER WEATHER | 0001 | 3/3/2018 | 3/18/2018 |
| INACTIVE | HURRICANE SARAH | 0011 | 12/29/2017 | 2/10/2018 |
| INACTIVE | CAT 01 WINTER WEATHER | 0012 | 3/3/2018 | 3/6/2018 |
| ACTIVE | WILD FIRE | 0013 | 2/25/2018 | 3/30/2018 |
| ACTIVE | FLOOD 2/2/2017 | 0014 | 3/10/2018 | 4/10/2018 |

ADD CATASTROPHE

DEFAULT VALUES   SAVE

*FIG. 22*

SEGMENTATION AND LOAD BALANCING

CROSS-REFERENCE TO RELATED APPLICATIONS

The present application is a continuation of co-pending U.S. patent application Ser. No. 17/390,779, entitled "LOAD BALANCING AND SEGMENTATION SYSTEM," filed Jul. 30, 2021, which is a continuation of U.S. patent application Ser. No. 16/284,286, now U.S. Pat. No. 11,080,791, entitled "SEGMENTATION AND BALANCING SYSTEM" filed Feb. 25, 2019, which claims priority to U.S. patent application Ser. No. 14/530,063, now U.S. Pat. No. 10,217,170, entitled "SYSTEM FOR CLAIM LOAD BALANCING" filed Oct. 31, 2014, which claims priority to U.S. Provisional Patent Application 62/046,348, entitled "SYSTEM FOR CLAIM DATA SEGMENTATION AND LOAD BALANCING" filed Sep. 5, 2014. The entire content of these applications are incorporated herein by reference for all purposes.

FIELD OF THE INVENTION

The present invention relates to computer systems and more particularly to computer systems that provide an automated insurance claim processing system.

BACKGROUND

An insurer may provide payments when claims are made in connection with an insurance policy. For example, an employee who is injured while working might receive payments associated with a workers' compensation insurance policy purchased by his or her employer. Similarly, a person involved in an automobile accident may receive a payment in connection with an automobile insurance policy. The insurer may assign a claim handler to communicate with a claimant, an employer, another insurer, and/or medical service providers to help determine the appropriate amount of payment. Note that submitted claims may involve various amounts of work by a claim handler. For example, one type or segment of insurance claim might be relatively straightforward while another segment of claims involve complex determinations of liability and/or injury issues.

In one approach, a received insurance claim is simply assigned to a claim handler in a random or round robin manner. This, however, might lead to one claim handler having a significantly more complex workload as compared to another claim handler. Moreover, manually determining the complexity of an insurance claim, and/or which claim handler it should be assigned, can be a time consuming and error prone task, especially when there are a substantial number of claims, of many different types, to be analyzed. For example, an insurer might receive tens of thousands of new insurance claims each year (which might represent a billion dollars of potential liability). It would therefore be desirable to provide systems and methods to facilitate the assignment of insurance claims to appropriate segments and/or to claim handlers in an automated, efficient, and accurate manner.

SUMMARY

According to some embodiments, systems, methods, apparatus, computer program code and means may facilitate the assignment of insurance claims to appropriate segments and/or claim handlers. In some embodiments, a communication device may receive data indicative of a plurality of insurance claims along with an indication of an appropriate claim segment classification for each insurance claim. A first claim handler may then be automatically selected for a first insurance claim based at least in part on: (i) a first segment classification associated with the first insurance claim, (ii) numbers of other insurance claims currently assigned to claim handlers, and (iii) load factors associated with claim handlers. An indication of the selected first claim handler may then be transmitted.

A technical effect of some embodiments of the invention is an improved and computerized method to facilitate the assignment of insurance claims to appropriate segments and/or claim handlers. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 is a tabular portion of an insurance claim database according to some embodiments.

FIG. 9 is a tabular portion of a cause of injury database according to some embodiments.

FIG. 17 is a tabular portion of a claim handler database according to some embodiments.

FIG. 20 illustrates a screen display of an assignment preferences table in accordance with some embodiments.

FIG. 22 illustrates a screen display of a catastrophe management table in accordance with some embodiments.

DETAILED DESCRIPTION

An insurer may provide payments when claims are made in connection with an insurance policy, such as a workers' compensation or automobile insurance policy. Note that embodiments may also be associated with other types of insurance, including long term disability insurance, short term disability insurance, flexible combinations of short and long term disability insurance, homeowners insurance, property insurance, general liability insurance, commercial insurance, and/or personal insurance.

Figure 1:
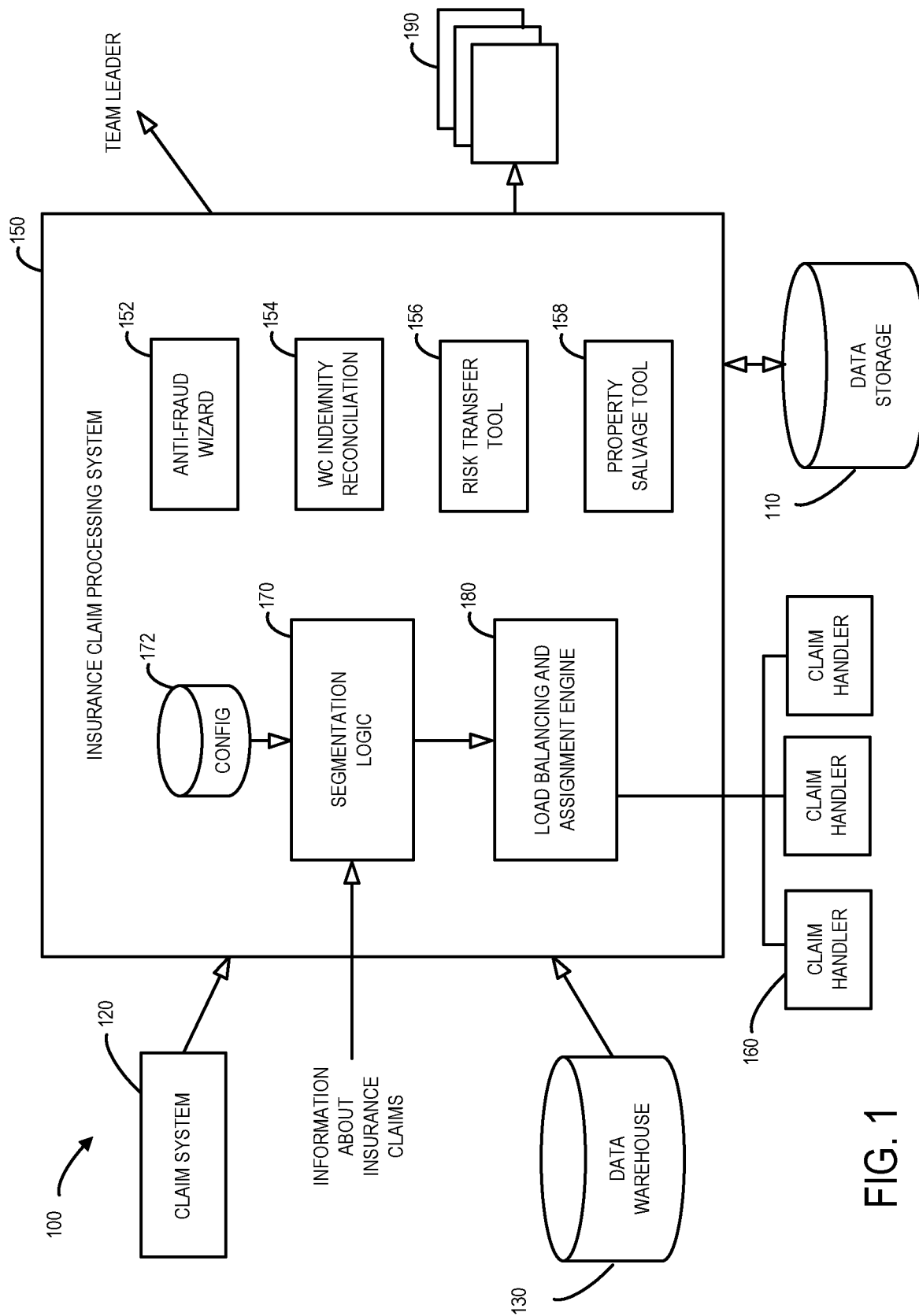
FIG. 1 is block diagram of a system according to some embodiments of the present invention.

Manually determining the complexity of each received insurance claim and/or which claim handler should be assigned to that claim can be time consuming and difficult task, especially when there are a substantial number of claims to be analyzed. It would therefore be desirable to provide systems and methods to facilitate the assignment of insurance claims to appropriate segments of complexity and/or to claim handlers. FIG. 1 is block diagram of a system 100 according to some embodiments of the present invention. In particular, the system 100 includes an insurance claim processing system 150 that receives information about insurance claims (e.g., by receiving an electronic file from a team leader, an employer, an employee, an insurance agent, a medical service provider, or a data storage unit 110). According to some embodiments, incoming telephone calls and/or documents from a doctor may be used to create information in a claim system 120 which, in turn, can provide information to the insurance claim processing system 150. In other embodiments, the insurance claim processing system 150 may retrieve information from a data warehouse 130 (e.g., when the insurance claim processing system 150 is associated with an automobile insurance system, some information may be copied from an automobile insurance data warehouse). In other embodiments, some or all of the information about an insurance claim may be received via a claim submission process.

The insurance claim processing system 150 may, according to some embodiments, include segmentation logic 170 that automatically determines an appropriate segment (e.g., based on the likely complexity or liability) for insurance claims (e.g., in accordance with customizable configurations parameters 172). This segmentation information may then be used by a load balancing and assignment engine 180 to select an appropriate claim handler 160 for each insurance claim. According to some embodiments, historical information may be used to generate appropriate segmentation and/or claim assignment rules to be applied based on the specific facts of the insurance claim being processed.

The insurance claim processing system 150 might be, for example, associated with a Personal Computers (PC), laptop computer, an enterprise server, a server farm, and/or a database or similar storage devices. The insurance claim processing system 150 may, according to some embodiments, be associated with an insurance provider.

According to some embodiments, an "automated" insurance claim processing system 150 may facilitate the assignment of insurance claims to appropriate segments and/or claim handlers 160. For example, the insurance claim processing system 150 may automatically output a recommended claim segment for a received insurance claim (e.g., indicating that the insurance claim belongs in a "high exposure" segment) which may then be used to facilitate assignment of a claim handler 160. As used herein, the term "automated" may refer to, for example, actions that can be performed with little (or no) intervention by a human. Moreover, any of the embodiments described herein may be "dynamically" performed by monitoring parameters and/or automatically updating outputs in substantially real time.

As used herein, devices, including those associated with the insurance claim processing system 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The insurance claim processing system 150 may store information into and/or retrieve information from the data storage 110. The data storage 110 might be associated with, for example, a client, an employer, or insurance policy and might store data associated with past and current insurance claims and/or payments. The data storage 110 may be locally stored or reside remote from the insurance claim insurance claim processing system 150. As will be described further below, the data storage 110 may be used by the insurance claim processing system 150 to generate predictive models. According to some embodiments, the insurance claim processing system 150 communicates a recommended claim processing workflow (e.g., expedited or normal workflows), such as by transmitting an electronic file to a claim handler 160, a client device, an insurance agent or analyst platform, an email server, a workflow management system, etc. In other embodiments, the insurance claim processing system 150 might output a recommended claim workflow indication to a team leader who might select a claim handler based on that indication or override the indication based on other factors associated with the insurance claim.

According to some embodiments, the insurance claim processing system 150 further includes an anti-fraud wizard 152 (e.g., to help detect inappropriate insurance claims), a Workers' Compensation ("WC") indemnity reconciliation tool 154 (e.g., to help a claim handler 160 comply with various jurisdiction based regulations), a risk transfer tool 156 (e.g., to help identify other parties who may have liability in connection with an insurance claim), and/or a property salvage tool 158 (e.g., to help identify situations where value may be identified and/or obtained in connection with an insurance claim). Moreover, the insurance claim processing system 150 may transmit information to other devices 190 or applications, such as email servers, report generators, calendar applications, etc. Note that at least some of the tool and other applications associated with the insurance claim processing system 150 might be incorporated within, or utilize, an electronic spreadsheet, such as the EXCEL® electronic spreadsheet program available from MICROSOFT®.

Although a single insurance claim processing system 150 is shown in FIG. 1, any number of such devices may be included. Moreover, various devices described herein might be combined according to embodiments of the present invention. For example, in some embodiments, the claim insurance claim processing system 150 and data storage 110 might be co-located and/or may comprise a single apparatus.

Figure 2:
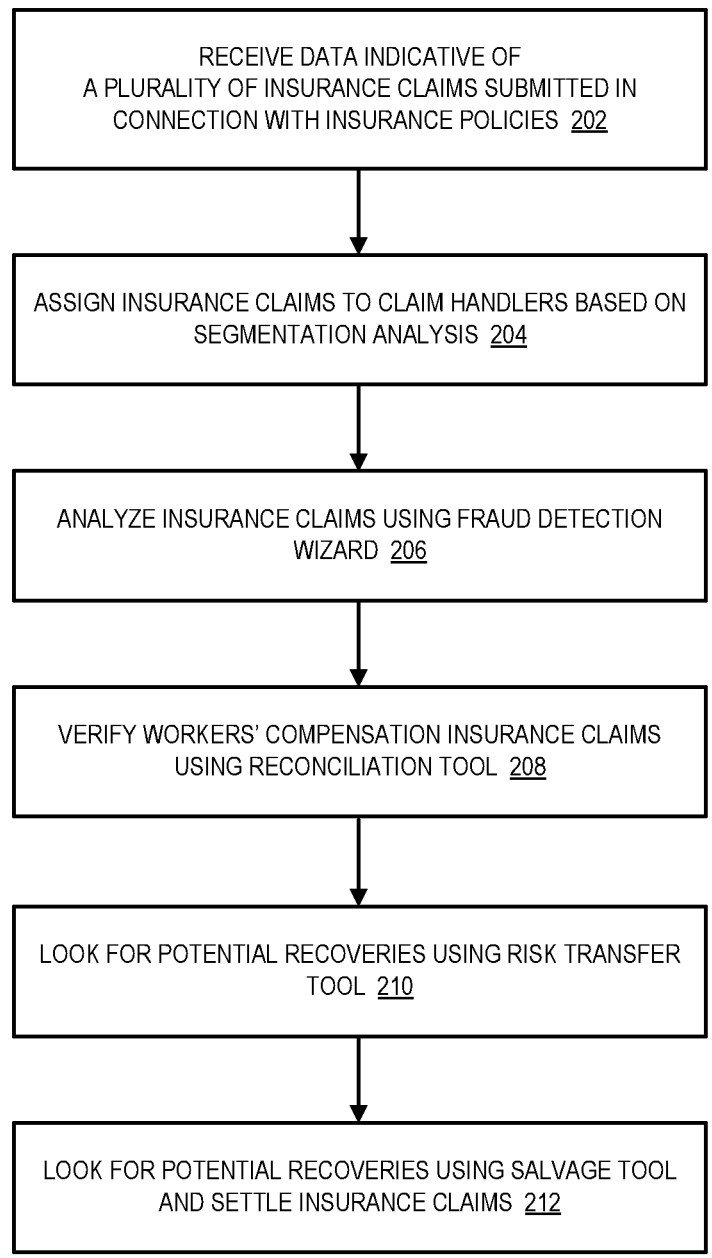
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, data may be received indicative of a plurality of insurance claims submitted in connection with insurance policies. The insurance claims might be associated with, for example, workers' compensation insurance claims and/or automobile insurance claims. Note that the data indicative of insurance claims might be received via submitted paper claims, a telephone call center, and/or an online claim submission web site.

At 204, insurance claims may be assigned to claim handlers based, at least in part, on a segmentation analysis. For example, an insurance claim might be recognized as requiring highly complex handling (e.g., a claim identified as a "longshore" claim) and thus be assigned to a "specialized" segment. As a result, the claim may be assigned to a particular group of claim handlers who have experience with these types of insurance claims.

At 206, insurance claims may be analyzed using a fraud detection wizard. The fraud detection wizard may, for example, look for suspicious information, patterns, or values within one or more insurance claims (which, when found, may prompt further investigation. At 208, workers' compensation insurance claims may be verified using a reconciliation tool. For example, different jurisdictions may have different recordkeeping requirement and/or penalties associated with workers' compensation claims and the reconciliation tool may help claim handlers process such claims in an appropriate manner. At 210, embodiments may look for potential recoveries using a risk transfer tool. According to some embodiments, the risk transfer tool might identify other parties (e.g., other insurance companies, employers, etc. who might be liable for at least a portion of the payments associated with an insurance claim). At 212, embodiments may look for potential recoveries using a salvage tool (e.g., the salvage value associated with an automobile accident) and the insurance claims may be settled.

Figure 3:
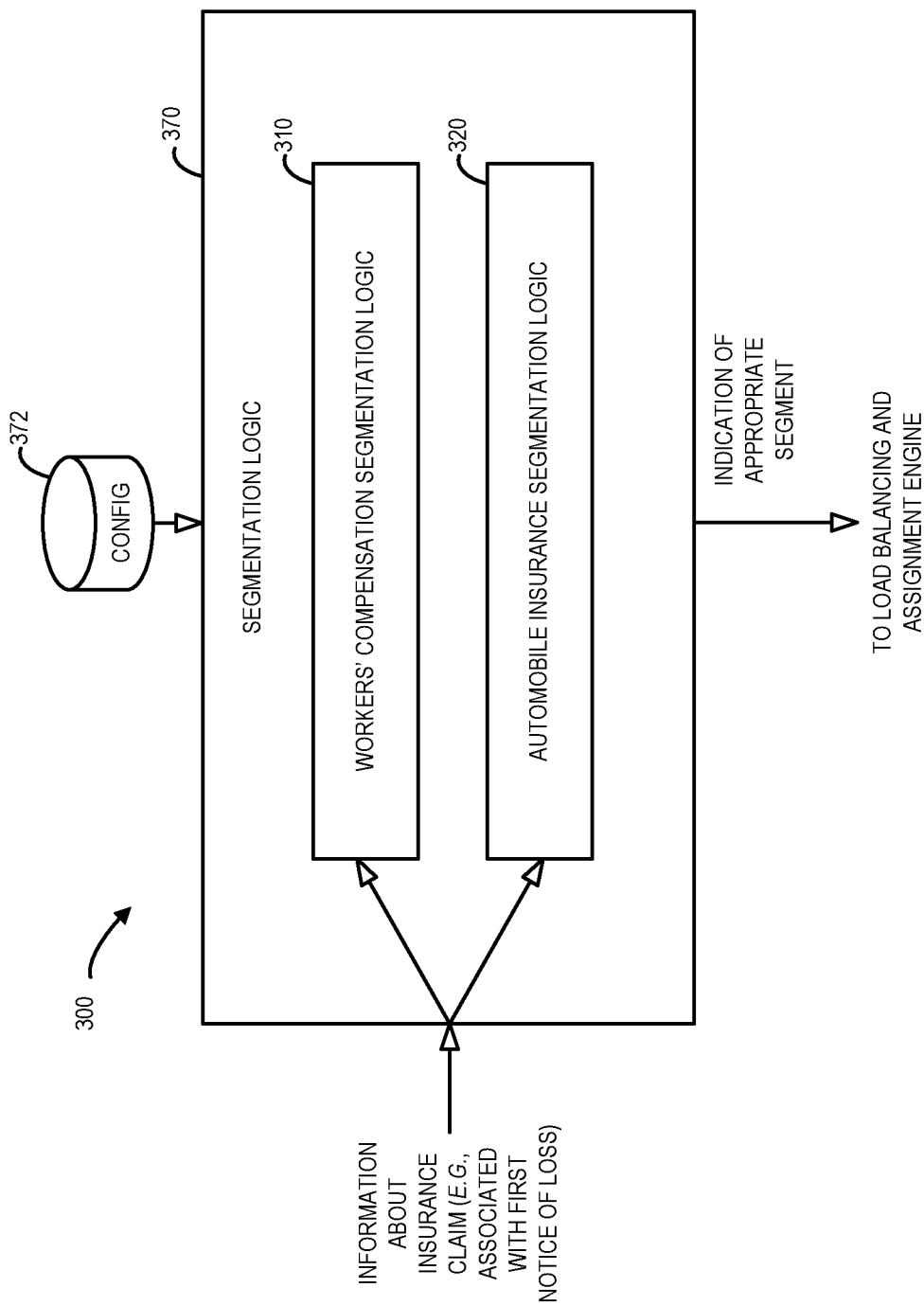
FIG. 3 is block diagram of a segmentation system according to some embodiments of the present invention.

FIG. 3 is block diagram of a segmentation system 300 according to some embodiments of the present invention. The segmentation system 300 includes segmentation logic 370 which may be associated with the segmentation logic 170 described with respect to FIG. 1. According to some embodiments, the segmentation logic 370 automatically determines an appropriate segment (e.g., based on the likely complexity or liability) for insurance claims (e.g., in accordance with customizable configurations parameters 372). This segmentation information may then be transmitted to a load balancing and assignment engine to select an appropriate claim handler for each insurance claim. Note that different types of insurance may be associated with different types of segmentation logic. For example, as illustrated in FIG. 3, a workers' compensation insurance claim may be processed using workers' compensation segmentation logic 310 while an insurance claim may be processed using automobile insurance segmentation logic 320.

Figure 4:
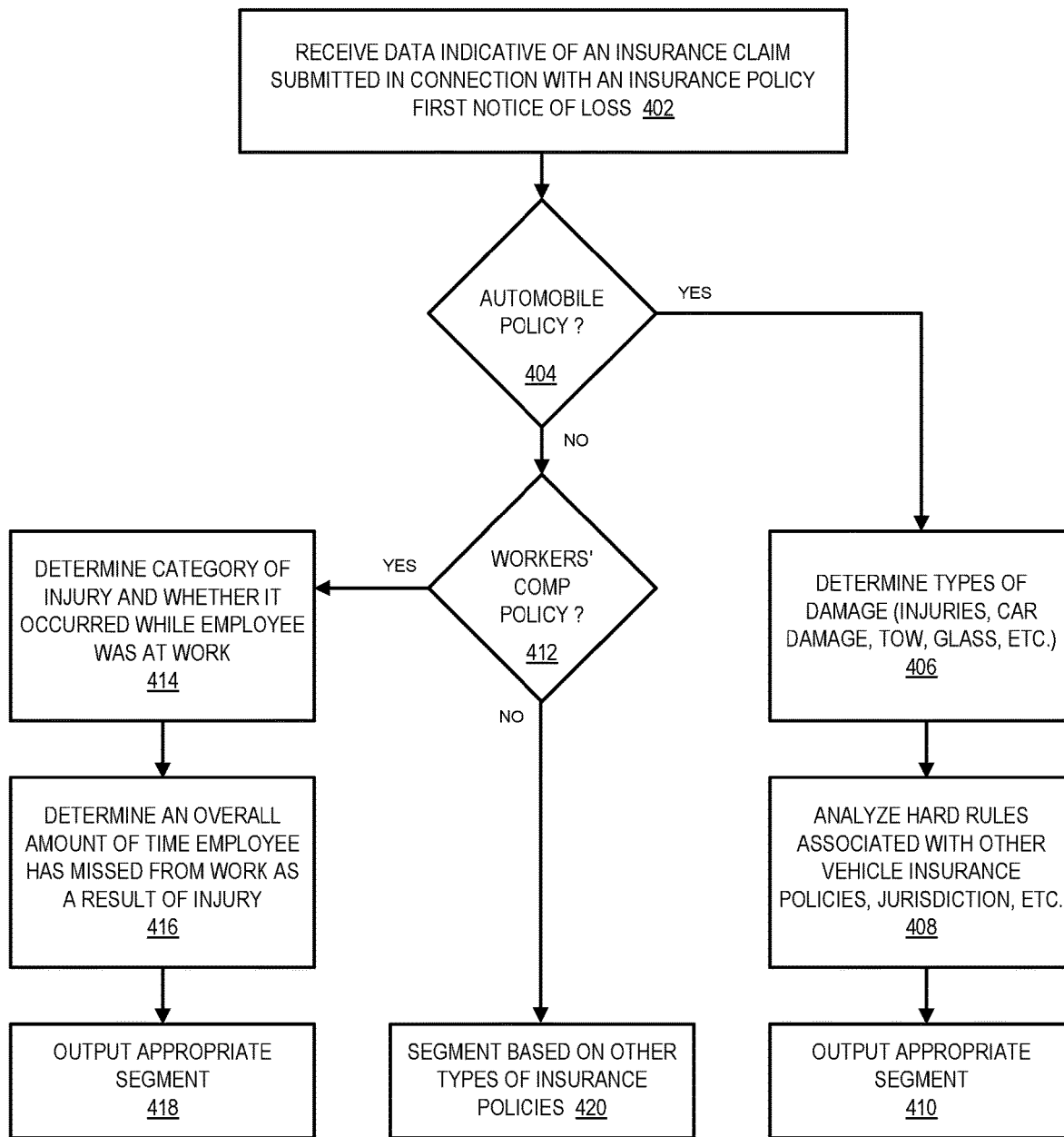
FIG. 4 is an example of a method that might be performed according to some embodiments.

FIG. 4 illustrates a method that might be performed by some or all of the elements of the system 300 described with respect to FIG. 3 according to some embodiments of the present invention. At 402, data may be received indicative of a plurality of insurance claims submitted in connection with insurance policies. The insurance claims might be associated with, for example, workers' compensation claims, business insurance claims, homeowners insurance claims, automobile insurance claims, and/or other types of insurance claims. Note that the data indicative of insurance claims might be received via submitted paper claims, a telephone call center, an online claim submission web page, etc. in connection with a First Notice Of Loss ("FNOL"). Although some embodiments are described with respect to a newly received insurance claim, note that any of the embodiments described herein may be performed in connection with an insurance claim currently being processed by a claim handler. For example, if information about the insurance claim changes (e.g., more information about an injury associated with the claim becomes available), the system may dynamically execute segmentation logic and automatically adjust the segment that is associated with the claim. Note that this may, in some cases, result in the insurance claim being assigned to a different claim handler.

At 404, it may be automatically determined if the insurance claim is associated with a first type of insurance. In the example of FIG. 4, it is determined if the insurance claim is associated with an automobile insurance policy. If so, embodiments may analyze the received data associated with the insurance claim, in accordance with first segmentation logic, to determine a segment classification appropriate for the insurance claim. In the example of FIG. 4, embodiments may analyze the types of damage associated with the insurance claim (e.g., whether people were injured, automobiles were damaged, windshields were broken, towing services were required, etc.) at 406. Embodiment may also analyze one or more hard rules associated with other vehicle insurance policies, state laws, etc. at 408. As a result of such an analysis, an appropriate segment for the automobile insurance claim may be output at 410.

If it was determined that the insurance claim was not associated with an automobile insurance policy at 404, it may be automatically determining if an insurance claim is associated with a second type of insurance. In the example of FIG. 4, it is determined if the insurance claim is associated with workers' compensation insurance policy at 412. If so, embodiments may analyze the received data associated with the insurance claim, in accordance with second segmentation logic, to determine a segment classification appropriate for the insurance claim. In the example of FIG. 4, embodiments may analyze the category of the injury and whether or not the injury occurred while the employee was working at 414. Embodiment may also analyze how long the employee has been absent from work as a result of the injury at 416. As a result of such an analysis, an appropriate segment for the workers' compensation claim may be output at 418.

If the insurance claim is not associated with an automobile or workers' compensation insurance policy, an appropriate segment may be determined with other logic at 420, such as logic associated with homeowners insurance, property insurance, general liability insurance, commercial insurance, and/or personal insurance. By way of examples, segmentation logic might evaluate a potential claim liability, an injury classification, an injury severity, whether or not people were hospitalized and/or admitted to an intensive care unit. As still other example, segmentation logic might evaluate a claimant age (e.g., claims associated with people over 60 years old might require special handling), co-morbidity information (e.g., claims associated with people having a Body Mass Index ("BMI") over a pre-determined threshold value might require special handling), an amount of work absence, jurisdiction information (e.g., claims from New York might be subject to certain restrictions), and/or an indication of potential litigation (e.g., if a particular claimant has legal representation, his or her claim might be assigned to a high risk segment and, as a result, be assigned to special group of claim handlers).

Figure 5:
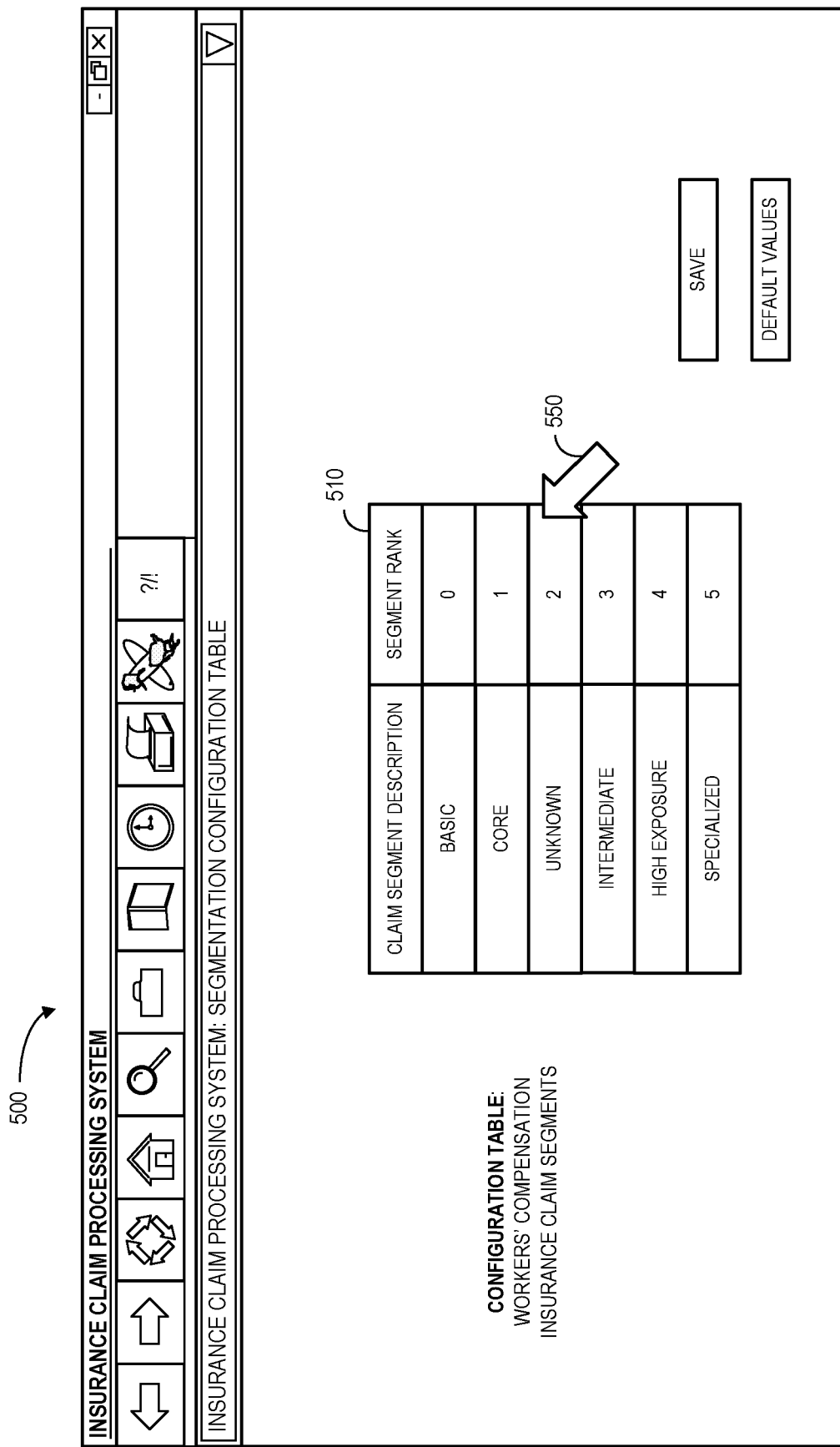
FIG. 5 illustrates a screen display of a configurable insurance claim segment ranking table in accordance with some embodiments.

According to some embodiments, segmentation logic may be associated with a segment ranking table. For example, FIG. 5 illustrates a screen display 500 of an insurance claim segment ranking table 510 in accordance with some embodiments. In particular, the table 510 includes the claim segment description and associated segment rank, with higher value ranking indicating more complex and/or higher risk insurance claims. According to some embodiments, the table is configurable, such as by letting an operator select 550 a segment and adjust that segment's position within the table. For example, the operator might select the "unknown" segment, drag it below the "intermediate" segment, and drop the segment. As a result, "unknown" might be assigned a rank of "3" and intermediate may be assigned a rank of "2." Such an adjustment to the table 510 may result in different claim handlers being selected for those segments.

Figure 6:
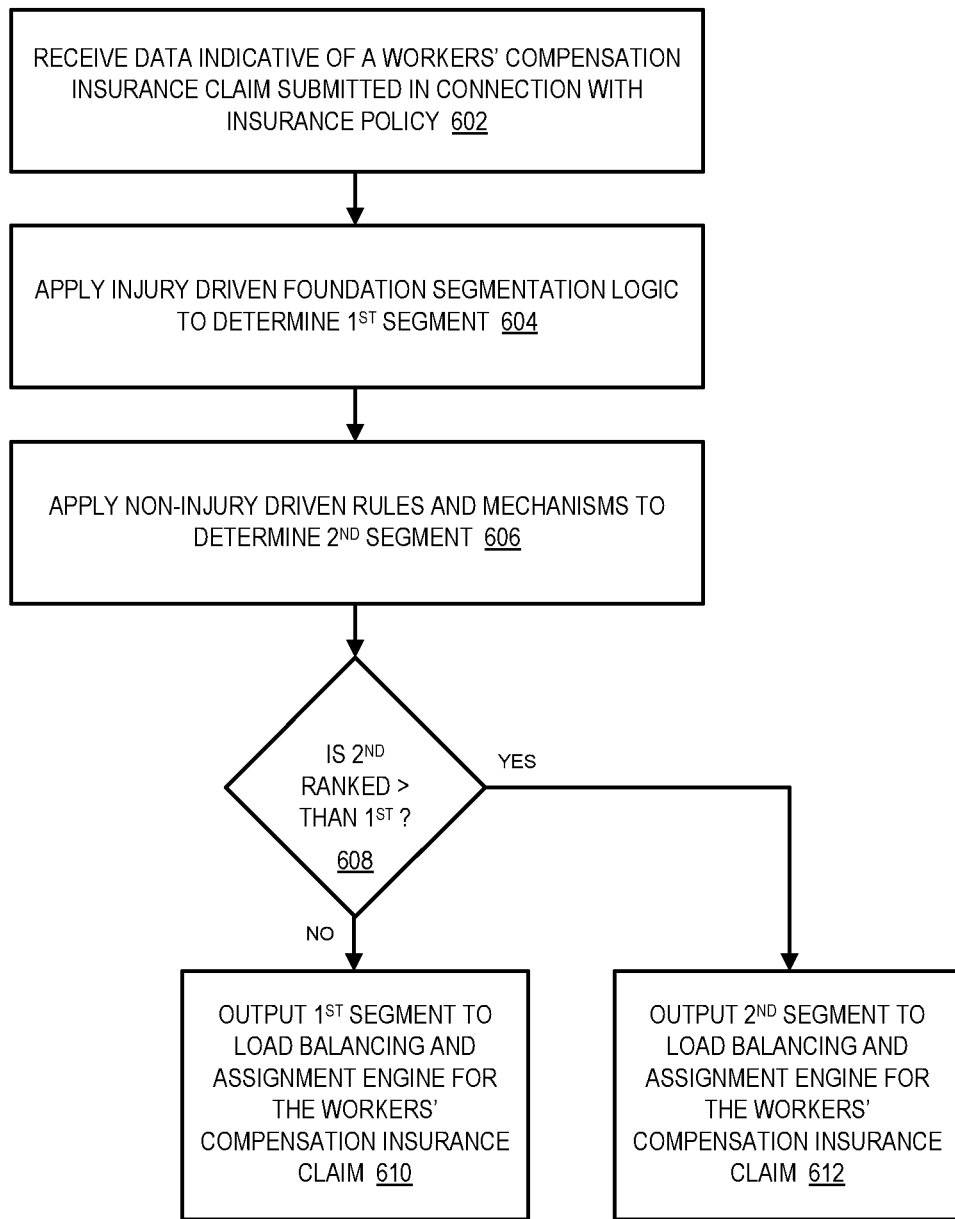
FIG. 6 is an example of a method that might be performed according to some embodiments.

FIG. 6 is an example of a method that might be performed according to some embodiments. At 602, data may be received indicative of a workers' compensation insurance claim. The data might include, or be supplemented to include, for example: a date and time, a claim number, a claim type, a loss date, a benefit state, a claimant name, a claimant date of birth, a cause of injury, a claim description, a body part, an injury, a return to work date, an indication of whether the claimant was injured doing normal job duties, an employment status, an indication of whether an injury resulted in death, an indication of whether the injury requires surgery, an indication of whether claim involves equipment or machinery, an indication of whether safety equipment was provided, an indication of whether the claim is questionable, and/or an indication of whether and injured worker is represented by an attorney. As still further examples, the data might include a claim description, a type of loss, a body part, an injury, a geographic location, and/or forms and policy endorsements associated with the insurance claim and/or insurance policy.

At 604, embodiments may apply injury driven foundation logic to determine a first segment for the insurance claim (an injury driven foundation segment). For example, the insurance claim might be associated with an injured finger and, as a result, be assigned to a "core" claim segment (with a rank of 1).

At 606, embodiments may apply non-injury driven rules and mechanisms to determine a second segment for the insurance claim (a non-injury driven segment). For example, the claimant might be over 60 years old and, as a result, the insurance claim might be assigned to an "intermediate" claim segment.

If the second segment (the non-injury driven segment) is not ranked higher than the first segment (the injury driven foundation segment) at 608, the first segment (the injury driven foundation segment) is output to a load balancing and assignment engine at 610. If the second segment (the non-injury driven segment) is ranked higher than the first segment at 608, the second segment is output to a load balancing and assignment engine at 612. That is, the higher ranked segment may always be selected for output to the load balancing and assignment engine for processing. The load balancing and assignment engine may then use that higher ranked segment when selecting a claim handler for the insurance claim.

Figure 7:
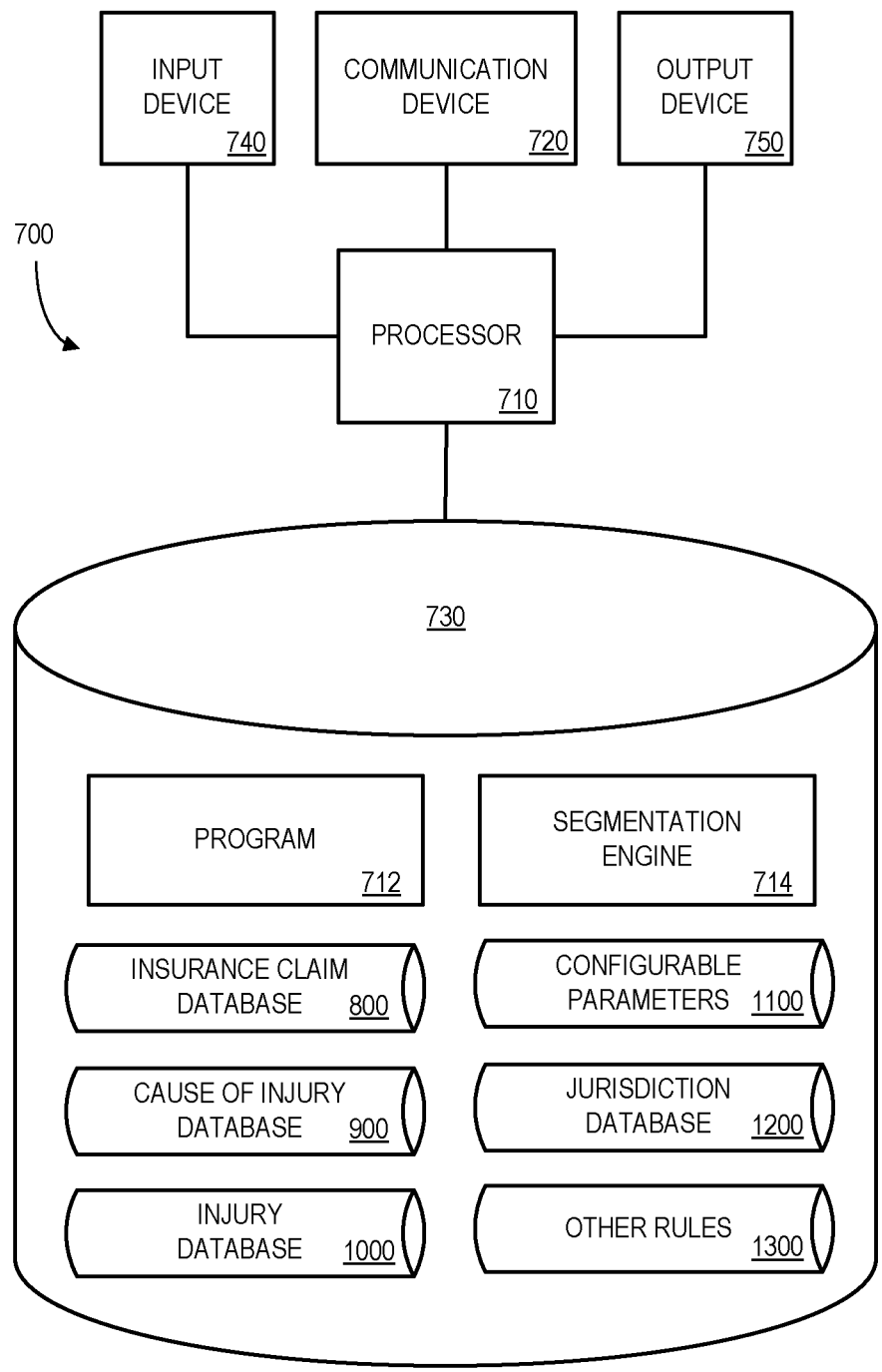
FIG. 7 is block diagram of a segmentation tool or platform according to some embodiments of the present invention.

Note that the embodiments described herein may be implemented using any number of different hardware configurations. For example, FIG. 7 illustrates a segmentation platform 700 that may be, for example, associated with the systems 100, 300 of FIGS. 1 and 3. The segmentation platform 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more claim systems, remote team leaders, load balancing and assignment engines, and/or claim handler devices. The segmentation platform 700 further includes an input device 740 (e.g., a mouse and/or keyboard to enter information about segmentation logic) and an output device 750 (e.g., to output an indication of an appropriate segment).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a segmentation engine 714 for controlling the processor 710. The processor 710 performs instructions of the programs 712, 714, and thereby operates in accordance with any of the embodiments described herein. For example, the processor 710 may receive data indicative of a plurality of insurance claims submitted in connection with insurance policies. The processor 710 may then automatically determine that a first insurance claim is associated with a first type of insurance and that a second insurance claim is associated with a second type of insurance. The received data associated with the first insurance claim may be analyzed by the processor 710 in accordance with first segmentation logic to determine a first segment classification appropriate for the first insurance claim. Similarly, the received data associated with the second insurance claim may be automatically analyzed the processor 710 in accordance with second segmentation logic to determine a second segment classification appropriate for the second insurance claim. Indications of the first and second segment classifications may then be transmitted (e.g., to a load balancing and assignment engine that automatically selects claim handlers for insurance claims).

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the segmentation platform 700 from another device; or (ii) a software application or module within the segmentation platform 700 from another software application, module, or any other source.

In some embodiments (such as shown in FIG. 7), the storage device 730 further stores an insurance claim database 800, a cause of injury database 900, an injury database 1000, a configurable parameters database 1100, a jurisdiction database 1200, and a database for other rules 1300. Examples of databases that may be used in connection with the segmentation platform 700 will now be described in detail with respect to FIGS. 8 through 13. Note that the database described herein is only one example, and additional and/or different information may be stored therein. Moreover, various databases might be split or combined in accordance with any of the embodiments described herein. For example, the configurable parameters database 1100 and/or the database for other rules 1300 might be incorporated with the segmentation engine 714.

Referring to FIG. 8, a table is shown that represents the insurance claim database 800 that may be stored at the segmentation platform 700 according to some embodiments. The table may include, for example, entries identifying insurance claims being processed in accordance with some embodiments described herein. The table may also define fields 802, 804, 806, 808, 810, 812 for each of the entries. The fields 802, 804, 806, 808, 810, 812 may, according to some embodiments, specify: a claim identifier 802, an insurance type 804, a jurisdiction 806, a cause of injury 808, an amount of time an employee may miss from work 810, and a segment 812. The insurance claim database 800 may be created and updated, for example, based on insurance claim information electrically received on a periodic basis.

The claim identifier 802 may be, for example, a unique alphanumeric code identifying an insurance claim that has been submitted in connection with insurance policy. The insurance type 804 may indicate the type of insurance associated with the claim and/or policy. For example, as illustrated in FIG. 8 the insurance claim having a claim identifier of "C_100004" is associated with "homeowners liability insurance." The jurisdiction 806 might indicate where the claim was made and/or where an injury occurred. The cause of injury 808 might indicate what type of injury is associated with the insurance claim and the amount of time an employee may miss from work 810 might indicate, for example, that a claimant is likely to be out of work for 2 weeks because of his or her injury. The segment 812 may indicate, for example, the automatically determined segment that reflects the insurance claim's level of complexity, potential liability, etc.

FIG. 9 is a tabular portion of a cause of injury database 900 that may be stored at the segmentation platform 700 according to some embodiments. The table may include, for example, entries identifying standard Claim Description Code ("CDC") and/or International Statistical Classification of Diseases and Related Health Problems ("ICD") codes associated with insurance claims. The table may also define fields 902, 904, 906, 908 for each of the entries. The fields 902, 904, 906, 908 may, according to some embodiments, specify: a cause of injury identifier 902, a cause of injury 904, an indication of whether new employees should be excluded 906, and a claim description 908. The cause of injury database 900 may be created and updated, for example, based on publically available and/or internal information electrically updated on a periodic basis.

The cause of injury identifier 902 may be, for example, a unique alphanumeric code identifying an injury that might be associated with an insurance claim and might be based on or associated with the cause of injury identifier 808 in the insurance claim database 800. The cause of injury 904 might provide more detailed information about the injury and the indication of whether new employees should be excluded 906 might indicate, for example, that newly hired claim handlers should not handle these types of injuries. Finally, the claim description 908 may explain what caused the injury (e.g., the cause of injury identifier 902 "COI_103" indicates that the claimant slipped or fell from a stairway, escalator, or elevator).

Figure 10:
FIG. 10 is a tabular portion of an injury database according to some embodiments.

FIG. 10 is a tabular portion of an injury database 1000 that may be stored at the segmentation platform 700 according to some embodiments. The table may include, for example, entries identifying specific injuries suffered by claimants. The table may also define fields 1002, 1004, 1006, 1008 for each of the entries. The fields 1002, 1004, 1006, 1008 may, according to some embodiments, specify: an injury identifier 1002, a body party 1004, an indication of whether new employees should be excluded 1006, and an injury description 1008. The injury database 1000 may be created and updated, for example, based on publically available and/or internal information electrically updated on a periodic basis.

The injury identifier 1002 may be, for example, a unique alphanumeric code identifying injuries that might be suffered by claimants. In particular, the body party 1004 may indicate where a claimant might be hurt and the indication of whether new employees should be excluded 1006 might prevent newly hired claim handlers from handling claims with this type of injury. The injury description 1008 may further describe the injury (e.g., the injury identifier 1002 "INJ_004" indicates that the claimant suffered a laceration on his or her facial soft tissue).

Figure 11:
FIG. 11 is a tabular portion of a configurable parameters database according to some embodiments.

FIG. 11 is a tabular portion of a configurable parameters database 1100 that may be stored at the segmentation platform 700 according to some embodiments. The table may include, for example, entries identifying parameters that can be configured by an operator to adjust segmentation logic. The table may also define fields 1102, 1104, 1106, 1108, 1110 for each of the entries. The fields 1102, 1104, 1106, 1108, 1110 may, according to some embodiments, specify: a configurable parameter identifier 1102, an insurance type 1104, an override indication 1106, a parameter description 1108, and a parameter value 1110. The configurable parameter database 1100 may be created and updated, for example, by an administrator, programmer, and/or operator of an insurance claim processing system.

The configurable parameter identifier 1102 may be, for example, a unique alphanumeric code identifying a parameter that may be used to control segmentation for a particular insurance type 1104. The override indication 1106 may indicate whether or not this parameter can be changed by particular parties. The parameter description 1108 and associated parameter value 1110 may define, for example, logic or a rule that can be used when performing segmentation on an insurance claim. For example, the configurable parameter 1102 of "CP_001" indicates that for workers' compensation insurance claims claimants over 60 years old a segment of "core" is the lowest ranked segment that is allowed to be output for that insurance claim. Moreover, by adjusting the parameter value 1110 in the database 1100, this age can be adjusted.

Figure 12:
FIG. 12 is a tabular portion of a jurisdiction database according to some embodiments.

FIG. 12 is a tabular portion of a jurisdiction database 1200 that may be stored at the segmentation platform 700 according to some embodiments. The table may include, for example, entries identifying jurisdictions that may be associated with insurance claims. The table may also define fields 1202, 1204, 1206 for each of the entries. The fields

1202, 1204, 1206 may, according to some embodiments, specify: a jurisdiction 1202, an insurance type 1204, and a rule 1206. The jurisdiction database 1200 may be created and updated, for example, by an administrator, programmer, and/or operator of an insurance claim processing system.

The jurisdiction 1202 may be, for example, a unique alphanumeric code identifying a jurisdiction (e.g., a stated) for a particular insurance type 1204. Moreover, the rule 1206 may define how insurance claims should be handled within that jurisdiction 1202. For example, in the jurisdiction 1202 of Connecticut, workers' compensation insurance claims might be subject to a statutory minimum average weekly wage of $400.

Figure 13:
FIG. 13 is a tabular portion of a database of other rules according to some embodiments.

FIG. 13 is a tabular portion of a database of other rules 1300 that may be stored at the segmentation platform 700 according to some embodiments. The table may include, for example, entries identifying rules that have been defined to be applied within segmentation logic. The table may also define fields 1302, 1304 for each of the entries. The fields 1302, 1304 may, according to some embodiments, specify: a rule identifier 1302 and the rule 1304. The database of other rules 1300 may be created and updated, for example, by an administrator, programmer, and/or operator of an insurance claim processing system.

The rule identifier 1302 may be, for example, a unique alphanumeric code identifying the rule 1304. For example, the rule identifier 1302 of "R_001" indicates that for workers' compensation claims, if the claim type is "longshore" then the output segment should be "specialized." As a result, those insurance claims may be assigned to a claim handler within a group of handlers having experience with those types of insurance claims.

Figure 14:
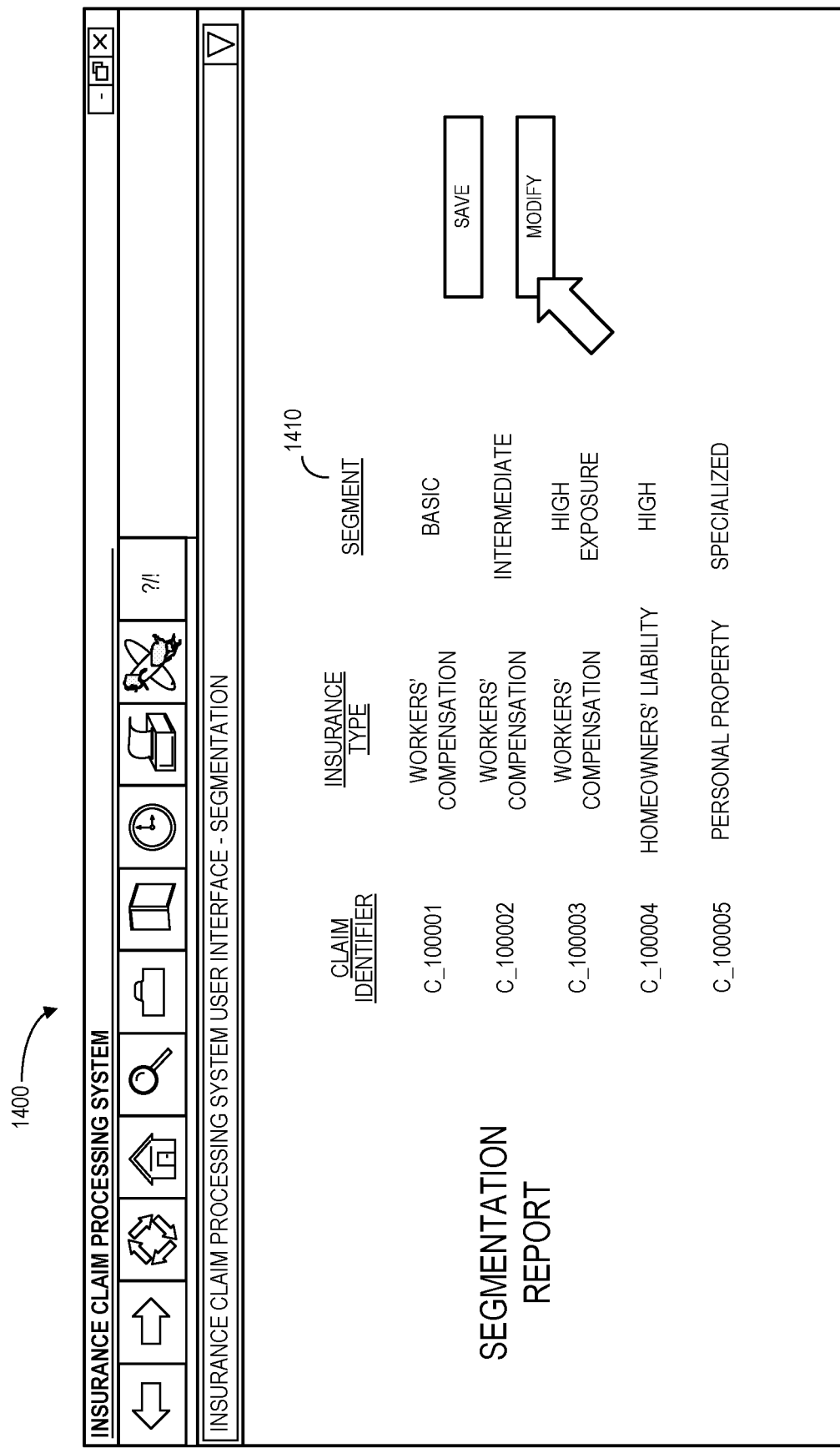
FIG. 14 illustrates a screen display of a segmentation report in accordance with some embodiments.

The information in the databases described with respect to FIGS. 8 through 13 may be used by a claim processing system (e.g., via segmentation logic within the system) to assign an appropriate segment to each insurance claim. For example, FIG. 14 illustrates a screen display 1400 of a segmentation report in accordance with some embodiments. In particular, the report lists insurance claims along with the segment 1410 that has been assigned to each claim. These segments 1410 may then be used to assign the claims to appropriate claim handlers.

Figure 15:
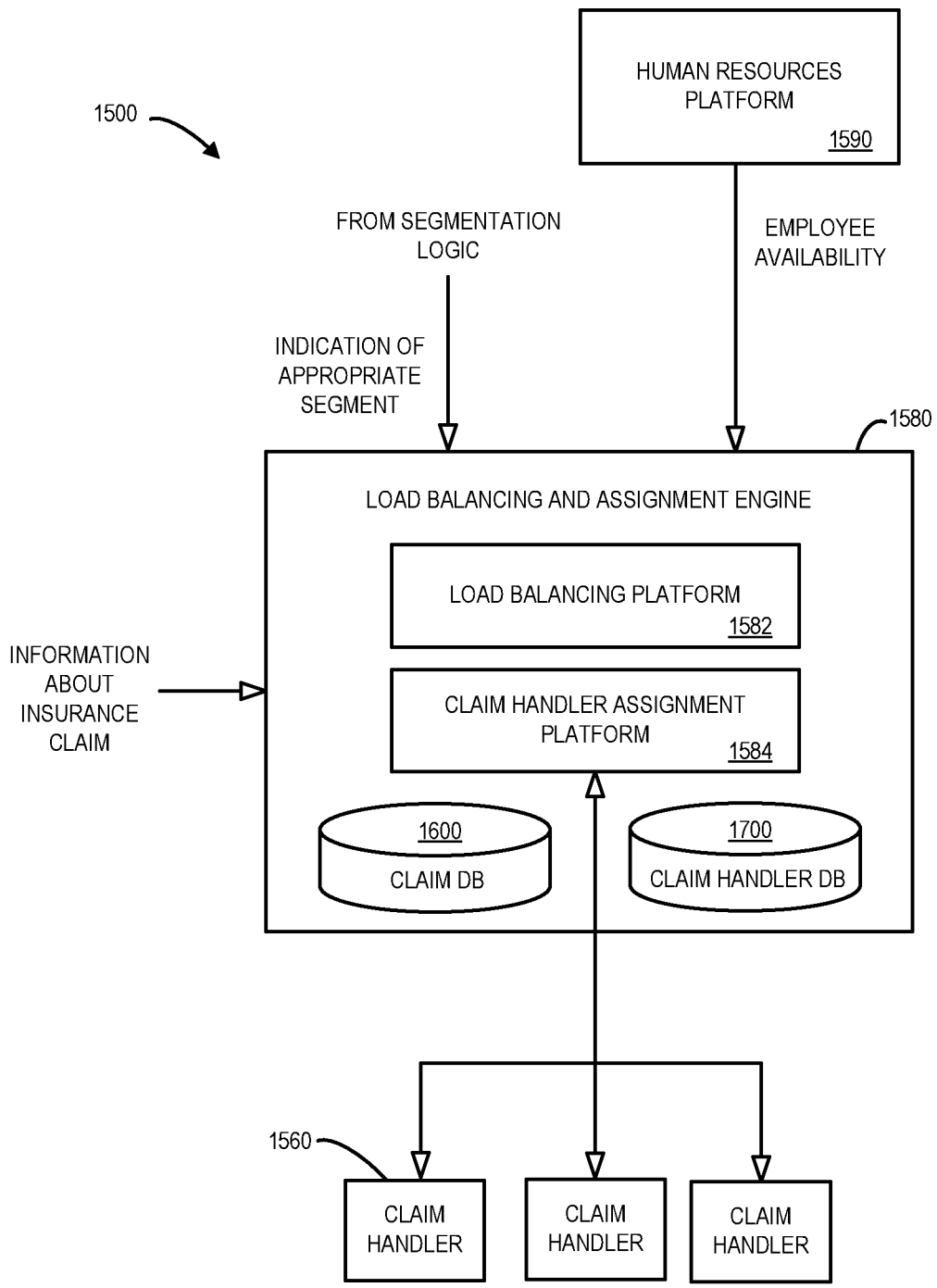
FIG. 15 is block diagram of a load balancing and assignment system according to some embodiments of the present invention.

FIG. 15 is block diagram of a load balancing and assignment system 1500 according to some embodiments of the present invention. The system 1500 includes a load balancing and assignment system 1500 includes a load balancing and assignment engine 1580 that may be associated with the load balancing and assignment system engine 180 of FIG. 1. The load balancing and assignment engine 180 may receive indications of segment classifications from segmentation logic. Moreover, a load balancing platform 1582 and/or claim handler assignment platform 1584 may use the segmentation information to assign insurance claims to appropriate claim handlers 1560. A claim database 1600 may store information about insurance claims that have been received by the insurance claim processing system, and a claim handler database 1700 may store information about the claim handlers 1560.

According to some embodiments, the load balancing platform 1582 may help ensure that various claim handlers 1560 work on an appropriate number of insurance claims at any given time. That is, the load balancing platform 1582 may select a claim handler 1560 based at least in part on the total number of insurance claims that are currently assigned to various claim handlers 1560. Moreover, according to some embodiments each claim handler 1560 is associated with a "load factor" that indicates a relative workload (e.g., total number of insurance claims) that might be appropriate for that particular handler 1560. For example, a newly hired claim handler 1560 might be expected to handle fewer insurance claims as compared to a more experience handler 1560.

Moreover, in some embodiments the load balancing platform may receive an indication of employee availability from a separate human resources platform 1590. The indication of employee availability may reflect, for example, paid time off, sick days, vacation, unpaid absences, an indication that an employee is temporarily away from his or her workstation, or a specific limitation associated with a specific employee (e.g., a particular claim handler might only work four hours per day). According to some embodiments, the load balancing platform 1582 may select a claim handler 1560 based at least in part on scheduled paid time off associated with each claim handler 1560. For example, a claim handler 1560 who is about to take a one week vacation might be expected to handle fewer insurance claims as compared to other claim handlers 1560. Still further, according to some embodiments the load balancing platform 1582 may select a claim handler 1560 based at least in part on a request for more insurance claims received from that claim handler 1560. For example, a claim handler 1560 who indicates he or she is available and able to take on additional cases may be more likely to be assigned a new insurance claim as compared to other claim handlers 1560.

Figure 16:
FIG. 16 is a tabular portion of a claim database according to some embodiments.

FIG. 16 is a tabular portion of a claim database 1600 that may be stored at the load balancing and assignment engine 1500 according to some embodiments. The table may include, for example, entries identifying claims being handled by the insurance claim processing system. The table may also define fields 1602, 1604, 1606, 1608 for each of the entries. The fields 1602, 1604, 1606, 1608 may, according to some embodiments, specify: a claim identifier 1602, an insurance type 1604, a segment 1606, and an assigned claim handler identifier 1608. The claim database 1600 may be created and updated, for example, based on information electrically received from segmentation logic and/or generated by a load balancing and assignment engine on a periodic basis.

The claim identifier 1602 may be, for example, a unique alphanumeric code identifying a claim being handled by the insurance claim processing system in connection with the insurance type 1604. The segment 1606 may indicate, for example, the complexity and/or level of risk for the claim as was automatically determined by segmentation logic. The assigned claim handler identifier 1608 may indicate, for example, a particular person who has been assigned to work on that insurance claim.

FIG. 17 is a tabular portion of a claim handler database 1700 that may be stored at the load balancing and assignment engine 1500 according to some embodiments. The table may include, for example, entries identifying people may be selected to handle incoming insurance claims. The table may also define fields 1702, 1704, 1706, 1708, 1710, 1712 for each of the entries. The fields 1702, 1704, 1706, 1708, 1710, 1712 may, according to some embodiments, specify: a claim handler identifier 1702, contact information 1704, a load factor 1706, a number of current claims 1708, upcoming paid time off information 1710, and a request more indication 1712. The claim handler database 1700 may be created and updated, for example, based on information entered by an operator or electronically received from an insurer's human resources department on a periodic basis.

The claim handler identifier 1702 may be, for example, a unique alphanumeric code identifying a person who might be available to work on incoming insurance claims and may be based on or associated with the assigned claim handler identifier 1612 in the claim database 1600. The contact information 1704 might be a telephone number, email or IP address, etc. indicating how communication with that person might be established.

The load factor 1706 and number of current claims 1708 being worked on by the claim handler may be used to balance workloads between claim handlers. In particular, a higher load factor 1706 may indicate that the claim handler is able to handle more claims as compared to handlers with lower load factors 1706 (with a load factor of 100% being average in the example of FIG. 17). In particular, an adjusted load $L_{ADJUSTED}$ may be calculated for a claim handler as follows:

$$L_{ADJUSTED} = \frac{NumberOfClaims_{Current}}{LF}$$

where $NumberOfClaims_{current}$ equals the current claims 1708 and LF equals the load factor 1706 in the claim handler database. The $L_{ADJUSTED}$ may then be used to compare workloads between claim handlers and assign new insurance claims as appropriate. In the example of FIG. 17, note that claim handler "H_101" is currently handling more claims (30 claims) as compared to claim handler "H_102" (25 claims). A new insurance claim, however, might be more likely to be assigned to "H_101" because his or her adjusted load (30 divided by 100=0.3) is lower than the adjusted load calculated for "H_102" (25 divided by 80=0.3125).

The upcoming paid time off information 1710 may indicate, for example, whether the handler associated with the claim handler identifier 1702 has an upcoming vacation scheduled, and the request more indication 1712 may indicate whether or not that particular handler has indicated that he or she is currently looking to take on additional work.

Figure 18:
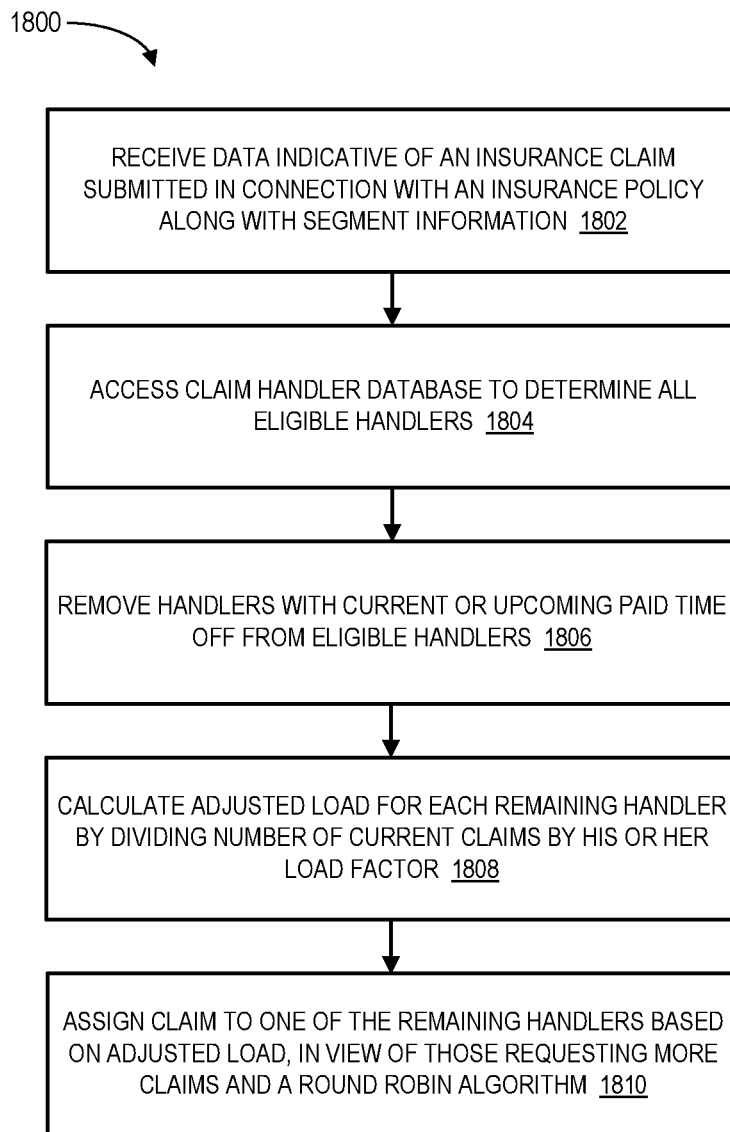
FIG. 18 is an example of a method that might be performed according to some embodiments.

Thus, the information in the database of FIGS. 16 and 17 may be used to assign new insurance claims to claim handlers. For example, FIG. 18 is an example of a method 1800 that might be performed according to some embodiments. At 1802, data indicative of an insurance claim submitted in connection with an insurance policy may be received along with automatically generated segmentation information. At 1804, a claim handler database may be accessed to determine a set of all eligible claim handlers for that insurance claim. The set may be based on, for example, the segmentation information and other information about the claim (e.g., the claim might require a Spanish speaking insurance claim handler).

At 1806, handlers with current or upcoming paid time off (e.g., vacations) may be removed from the set of eligible claim handlers. At 1808, an adjusted load may be calculated for each remaining handler by dividing the number of claims he or she is currently working on by his or her load factor. At 1810, the insurance claim may then be assigned to one of the remaining handlers based on the adjusted workloads. According to some embodiments, an insurance claim processing system may also take into consideration those handlers who have requested more work (if any) and/or use a round robin algorithm to resolve situation where multiple handlers are equally suitable to receive an insurance claim.

Figure 19:
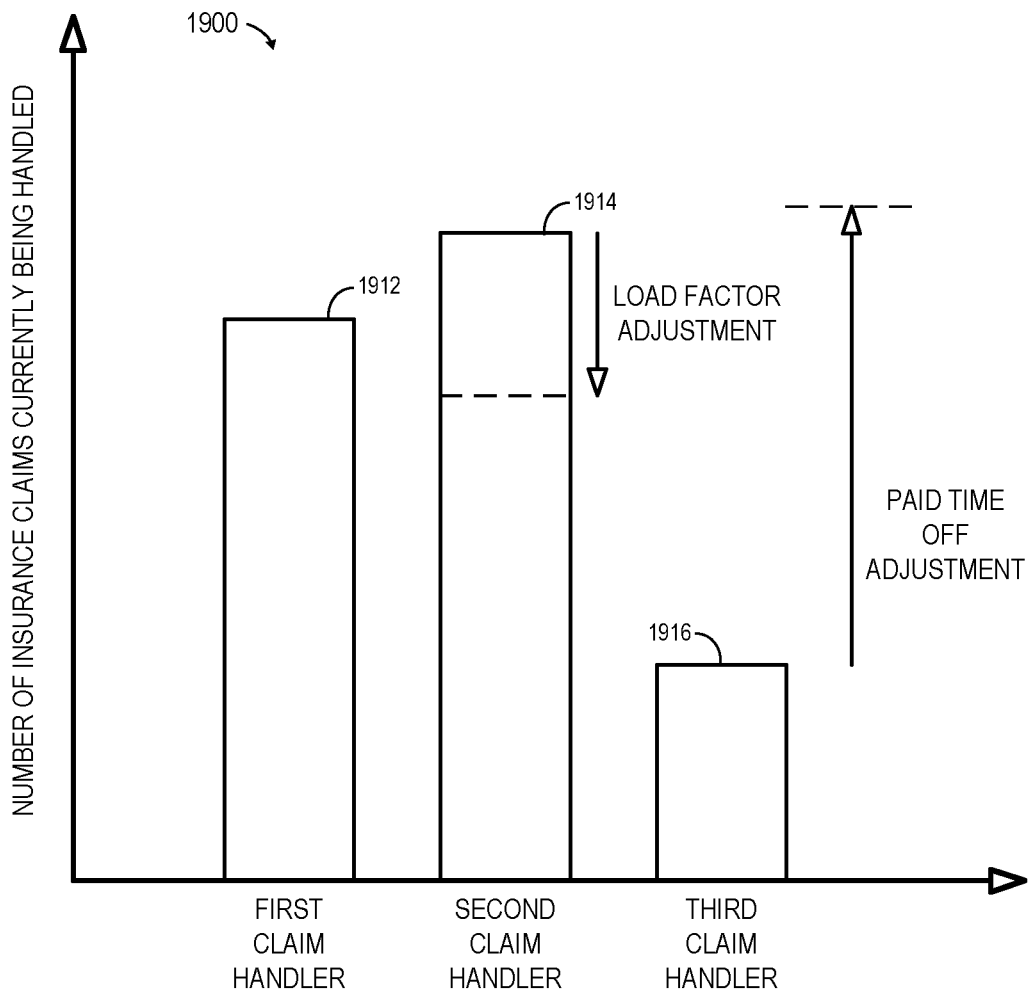
FIG. 19 is a graph illustrating overall numbers of insurance claims that are currently being processed by claim handlers via an expedited workflow in accordance with some embodiments.

FIG. 19 is a graph 1900 illustrating overall numbers of insurance claims that are currently being processed by claim handlers via an expedited workflow in accordance with some embodiments. The solid bars in FIG. 19 indicate how many insurance claims each of three handlers are currently working on. That is, a first claim handler is working on fewer claims 1912 as compared to a second claim handler 1914, and a third claim handler is worker the fewest claims 1916. Thus, a newly received insurance claim might be assigned to the third claim handler (assuming he or she is appropriate in view of the new claim's segment). However, a paid time off adjustment might be made for the third claim handler because he or she is planning on taking a two week vacation (that is, the paid time off information can be used for more than a simple "removal" of the handler as was described in FIG. 18). As a result of this adjustment, the third claim handler has the highest workload (as illustrated by the dotted line). Moreover, a load factor adjustment has been made for the second claim handler's workload (as illustrated by the dashed line), perhaps because he or she is more experienced and/or productive as compared to the other handlers. As a result, the second claim handler has the lowest caseload (as illustrated by the dashed line) and would therefore receive the next insurance claim that is received by the insurance claim processing system. According to some embodiments, after selection of a claim handler for an insurance claim, feedback performance data may be evaluated (e.g., queue lengths, claim processing times, quality reviews, etc.) and, as a result of the evaluation, that insurance claim may be re-assigned to a different claim handler.

In some cases, insurance claims may be assigned to claim handlers based on information other than case loads and vacation time. For example, FIG. 20 illustrates a screen display 2000 of an assignment preferences table for a particular type of insurance line of business 2010 (e.g., automobile, property, general liability, or workers' compensation) in accordance with some embodiments. The assignment preferences table may let business users configure claim handler assignment for particular offices 2020 (e.g., at different geographical locations such that claim handlers may be associated with one of a plurality of claim handler offices, at least one of the claim handler offices being remote from other claim handler offices) and/or claim segments 2022 (i.e., core, intermediate, etc.). According to some embodiments, overflow rules may let business users set an overflow threshold. The system may allow, for example, a different overflow threshold on Mondays 2024 to account for the addition volume that may have accumulated over the weekend. When all users in an office with the respective segment attribute meet or exceed the threshold (based on the number claims assigned that day), the standard overflow threshold 2026 is met.

The table may let business users set either an overflow segment 2028 or an overflow queue 2030, which instructs the system what to do when the overflow threshold is met. In the case of an overflow segment 2028, the system may add users with the defined overflow segment 2022 to the group of users eligible for assignment when the overflow threshold 2026 is met. Note the system may load balances amounts for both segments such that if the users of the initial segment are less busy the system will likely continue to assign claims to the initial segment. On the other hand, if users of the overflow segment are less busy the system will likely assign claims to the overflow segment.

In the case of an overflow queue 2030, the system may assigns claim with the respective claim segment to the specified overflow queue 2030 when overflow threshold 2026 is met. Thus, the specified queue may cross offices 2020 and even lines of business 2010.

According to some embodiments, the display 2000 lets business users toggle assignments directly to a user or directly to a queue. When the direct assign queue 2032 is blank, the system may assign claims with the respective claim segment 2022 directly to a claim handler using the load balancing algorithm. On the other hand, when a queue 2032 is specified, the system may assign claims with the respective claim segment 2022 to the specified queue 2023. Again, note that the specified queue 2032 can cross offices 2020 and lines of business 2010.

According to some embodiments, the table lets business users assign claims to specified queues at night 2024 and/or on the weekends. The night 2034 timeframe may be defined by the business. When the night 2034 and/or the weekend queues are specified, the system may assign claims with the respective segment 2022 to the specified queue 2034 when claims are reported within the business definition of night (or on the weekend). Because automated assignment occurs continuously, this capability may let the business manually assign claims to adjusters who are actually at work and/or are working after hours.

In some embodiments, users may designate an exception queue 2036 for exception scenarios. When the system cannot find an eligible user, the claim is assigned to the designated exception queue 2036. This may occur, for example, if the system is unable to find a user with the required attributes or if all users with the required attributes are on vacation.

According to some embodiments, the system determines if users are eligible for assignment by comparing the claim details with user profiles. The system may determine eligibility based on three attribute categories: segment attributes, expertise attributes, and state attributes. The segment attributes may be primary determining factor, and a single user may be qualified to handle multiple segments. The expertise attributes (e.g., commercial claims, personal claims, claim plus claims, non-claim plus claims, employee claims, personal toys claims, uninsured motorist claims, employer's liability, loss assessment claims, identity theft claims, asbestos claims, etc.) may be used to designate a special skill or ability to handle special claim types. Expertise attributes may vary by line of business. The state attributes (e.g., AK, CA, DE, FL, NY, CT, etc.) may indicate that most adjusters handle a subset of states within their respective office based on business needs and/or state licensing requirements.

In some embodiments, automated re-segmentation may be performed. Note that the system may derive a claim segment based on claim details at FNOL and post-FNOL. The FNOL segmentation and post-FNOL re-segmentation may use the same logic, however there may be a number of fields that only become available post-FNOL (e.g., a claimant's height & weight). When one or more of the following data elements are adjusted post-FNOL, the system may re-run the segmentation logic and automatically re-segment the claim if warranted: loss date, loss state, claim description code, injury, matters, and/or reserves. If the segment is different and the claim requires a higher level resource based on the segmentation hierarchy for each line of business, the system may generate a re-assignment activity for the current adjuster's team leader.

Figure 21:
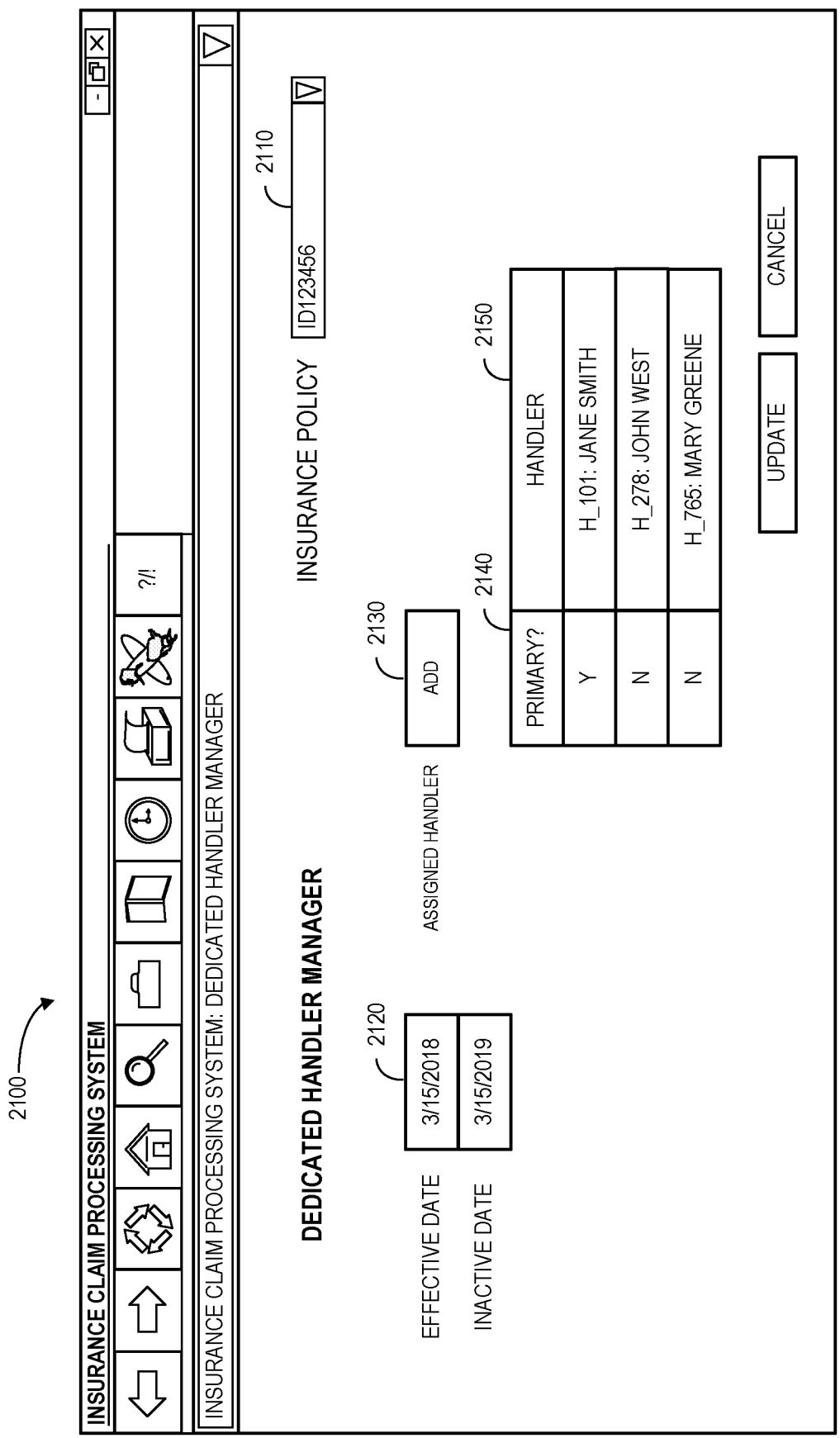
FIG. 21 illustrates a screen display of a dedicated claim handler manager in accordance with some embodiments.

Certain insurance policies and/or insured may be associated with particular claim handlers. In such cases, the system may let business users assign one or more handlers to a specific account at the policy level. For example, FIG. 21 illustrates a screen display 2100 of a dedicated claim handler manager in accordance with some embodiments. The user may select an insurance policy identifier 2110 or insured to be associated with a team of dedicated claim handler. Note that if a particular insured has both automobile and general liability policies with an insurer, a different handler or group of handlers might be assigned to that account based on each line of business. According to some embodiments, a user may define a period 2120 during which the dedicated handlers will receive insurance claims. The user may also add 2130 handlers 2150 to the team for that insurance policy as appropriate. According to some embodiments, the user may identify some handlers as "Primary" 2140 handlers. In this case, the system may assign all claims for that account to the primary handler. If the primary is not available (e.g., he or she is sick or on vacation), the system may instead assign insurance claims to one or more backup handlers as defined on the display 2100 (e.g., primary 2140 equals "N"). According to some embodiments, a dedicated team might be associated with an insurance policy such that if more than one handler is dedicated to an account/policy and no primary is specified, the system may interpret this as meaning that specified handlers are dedicated and load balance claims for the account evenly amongst the group.

Some embodiment may provide for catastrophe management. For example, FIG. 22 illustrates a screen display 2200 of a catastrophe management table in accordance with some embodiments. In particular, the display 2200 lets business users set catastrophe routing preferences for each catastrophe. The display 2200 may, for example, let the user a user add a catastrophe 2210 by defining a status 2222 (e.g., active or inactive), a catastrophe name 2222, an identifier 2224, a begin date 2228, and an end date 2228. According to some embodiments, all claims associated with a catastrophe are load balanced amongst eligible adjusters in a Catastrophe Claim Office ("CCO"). In some embodiments, claims associated with a catastrophe are assigned to the field the same way claims not associated with the catastrophe would be assigned. That is, claims may be load balanced among eligible adjusters in the field claim offices vs. (instead of the CCO) the CAT claim office. According to some embodiments, all claims associated with a catastrophe are load balanced among eligible adjusters in both the CCO and the field claim offices.

Thus, segmentation logic and/or a load balancing and assignment engine may facilitate the processing of insurance claims. According to some embodiment, a predictive model may be used in connection with the segmentation and/or assignment processes. As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model might be trained with historical claim transaction data, and be applied to current claim transactions to determine how the current claim transactions should be handled. Both the historical claim transaction data and data representing the current claim transactions might include, according to some embodiments, indeterminate data or information extracted therefrom. For example, such data/information may come from narrative and/or medical text notes associated with a claim file.

Figure 23:
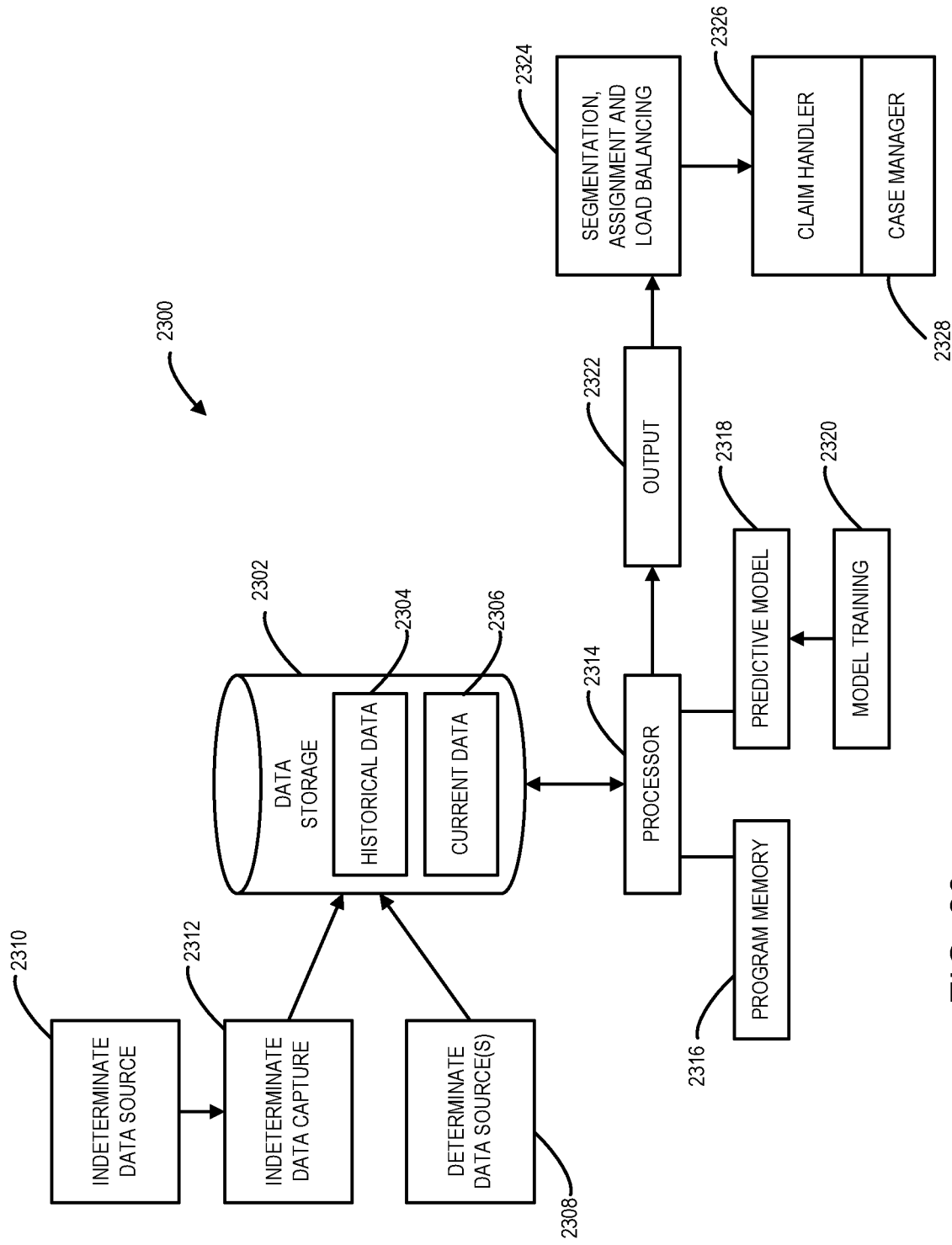
FIG. 23 is a partially functional block diagram that illustrates aspects of a computer system provided in accordance with some embodiments of the invention.

Features of some embodiments associated with a predictive model will now be described by first referring to FIG. 23. FIG. 23 is a partially functional block diagram that illustrates aspects of a computer system 2300 provided in accordance with some embodiments of the invention. For present purposes it will be assumed that the computer system 2300 is operated by an insurance company (not separately shown) for the purpose of referring certain claims to insurance claim workflows and/or handlers as appropriate.

The computer system 2300 includes a data storage module 2302. In terms of its hardware the data storage module 2302 may be conventional, and may be composed, for example, by one or more magnetic hard disk drives. A function performed by the data storage module 2302 in the computer system 2300 is to receive, store and provide access to both historical claim transaction data (reference numeral 2304) and current claim transaction data (reference numeral 2306). As described in more detail below, the historical claim transaction data 2304 is employed to train a predictive model to provide an output that indicates how a claim should by assigned to claim handler, and the current claim transaction data 2306 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing claim patterns.

Either the historical claim transaction data 2304 or the current claim transaction data 2306 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about how an accident occurred.

The determinate data may come from one or more determinate data sources 2308 that are included in the computer system 2300 and are coupled to the data storage module 2302. The determinate data may include "hard" data like the claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 2310, and may be extracted from raw files or the like by one or more indeterminate data capture modules 2312. Both the indeterminate data source(s) 2310 and the indeterminate data capture module(s) 2312 may be included in the computer system 2300 and coupled directly or indirectly to the data storage module 2302. Examples of the indeterminate data source(s) 2310 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 2312 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 2300 also may include a computer processor 2314. The computer processor 2314 may include one or more conventional microprocessors and may operate to execute programmed instructions to provide functionality as described herein. Among other functions, the computer processor 2314 may store and retrieve historical claim transaction data 2304 and current claim transaction data 2306 in and from the data storage module 2302. Thus the computer processor 2314 may be coupled to the data storage module 2302.

The computer system 2300 may further include a program memory 2316 that is coupled to the computer processor 2314. The program memory 2316 may include one or more fixed storage devices, such as one or more hard disk drives, and one or more volatile storage devices, such as RAM devices. The program memory 2316 may be at least partially integrated with the data storage module 2302. The program memory 2316 may store one or more application programs, an operating system, device drivers, etc., all of which may contain program instruction steps for execution by the computer processor 2314.

The computer system 2300 further includes a predictive model component 2318. In certain practical embodiments of the computer system 2300, the predictive model component 2318 may effectively be implemented via the computer processor 2314, one or more application programs stored in the program memory 2316, and data stored as a result of training operations based on the historical claim transaction data 2304 (and possibly also data resulting from training with current claims that have been processed). In some embodiments, data arising from model training may be stored in the data storage module 2302, or in a separate data store (not separately shown). A function of the predictive model component 2318 may be to determine appropriate segmentation logic and/or claim assignment process. The predictive model component may be directly or indirectly coupled to the data storage module 2302.

The predictive model component 2318 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 2300 includes a model training component 2320. The model training component 2320 may be coupled to the computer processor 2314 (directly or indirectly) and may have the function of training the predictive model component 2318 based on the historical claim transaction data 2304. (As will be understood from previous discussion, the model training component 2320 may further train the predictive model component 2318 as further relevant claim transaction data becomes available.) The model training component 2320 may be embodied at least in part by the computer processor 2314 and one or more application programs stored in the program memory 2316. Thus the training of the predictive model component 2318 by the model training component 2320 may occur in accordance with program instructions stored in the program memory 2316 and executed by the computer processor 2314.

In addition, the computer system 2300 may include an output device 2322. The output device 2322 may be coupled to the computer processor 2314. A function of the output device 2322 may be to provide an output that is indicative of (as determined by the trained predictive model component 2318) particular segmentation information for the current claim transactions. The output may be generated by the computer processor 2314 in accordance with program instructions stored in the program memory 2316 and executed by the computer processor 2314. More specifically, the output may be generated by the computer processor 2314 in response to applying the data for the current claim transaction to the trained predictive model component 2318. The output may, for example, be a true/false flag or a number within a predetermined range of numbers. In some embodiments, the output device may be implemented by a suitable program or program module executed by the computer processor 2314 in response to operation of the predictive model component 2318.

Still further, the computer system 2300 may include a segmentation, assignment, and load balancing module 2324. The segmentation, assignment, and load balancing module 2324 may be implemented in some embodiments by a software module executed by the computer processor 2314. The segmentation, assignment, and load balancing module 2324 may have the function of directing workflow based on the output from the output device. Thus the segmentation, assignment, and load balancing module 2324 may be coupled, at least functionally, to the output device 2322. In some embodiments, for example, the segmentation, assignment, and load balancing module 2324 may direct workflow by referring, to a claim handler 2326, current claim transactions analyzed by the predictive model component 2318 and found to be associated with one or more claim segments. In some embodiments, these current claim transactions may be referred to case manager 2328 who is associated with the claim handler 2326. The claim handler 2326 may be a part of the insurance company that operates the computer system 2300, and the case manager 2328 might be an employee of the insurance company.

Figure 24:
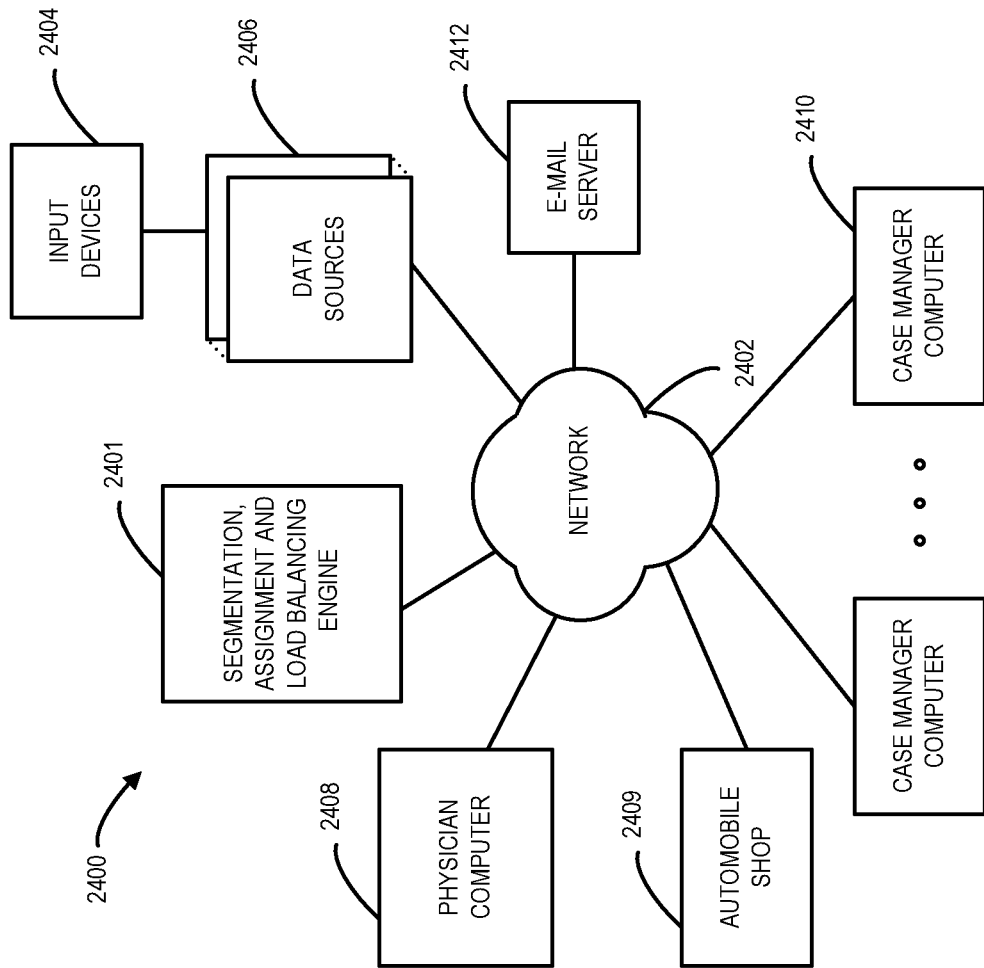
FIG. 24 is a block diagram that provides another representation of aspects of the system of FIG. 20.

FIG. 24 is another block diagram that presents a computer system 2400 in a somewhat more expansive or comprehensive fashion (and/or in a more hardware-oriented fashion). The computer system 2400, as depicted in FIG. 24, includes a "segmentation, assignment, and load balancing engine" 2401 to automatically and selectively assess newly received insurance claims for the insurance company. As seen from FIG. 24, the computer system 2400 may further include a conventional data communication network 2402 to which the segmentation, assignment, and load balancing engine 2401 is coupled.

FIG. 24 also shows, as parts of computer system 2400, data input device(s) 2404 and data source(s) 2406, the latter (and possibly also the former) being coupled to the data communication network 2402. The data input device(s) 2404 and the data source(s) 2406 may collectively include the devices 2308, 2310 and 2312 discussed above with reference to FIG. 23. More generally, the data input device(s) 2404 and the data source(s) 2406 may encompass any and all devices conventionally used, or hereafter proposed for use, in gathering, inputting, receiving and/or storing information for insurance company claim files.

Still further, FIG. 24 shows, as parts of the computer system 2400, personal computer 2408 assigned for use by one or more physicians (who may be associated with the insurance company's long term disability insurance program), automobile shop computer 2409 (e.g., to transmit repair estimates), and personal computers 2410 assigned for use by case managers (who might also be associated with team leaders and/or claim handlers the long term disability insurance program). The personal computers 2408, 2409, 2410 may be coupled to the data communication network 2402.

Also included in the computer system 2400, and coupled to the data communication network 2402, is an electronic mail server computer 2412. The electronic mail server computer 2412 provides a capability for electronic mail messages to be exchanged among the other devices coupled to the data communication network 2402. Thus the electronic mail server computer 2412 may be part of an electronic mail system included in the computer system 2400. The computer system 2400 may also be considered to include further personal computers (not shown), including, e.g., computers which are assigned to individual claim handlers or other employees of the insurance company.

Figure 25:
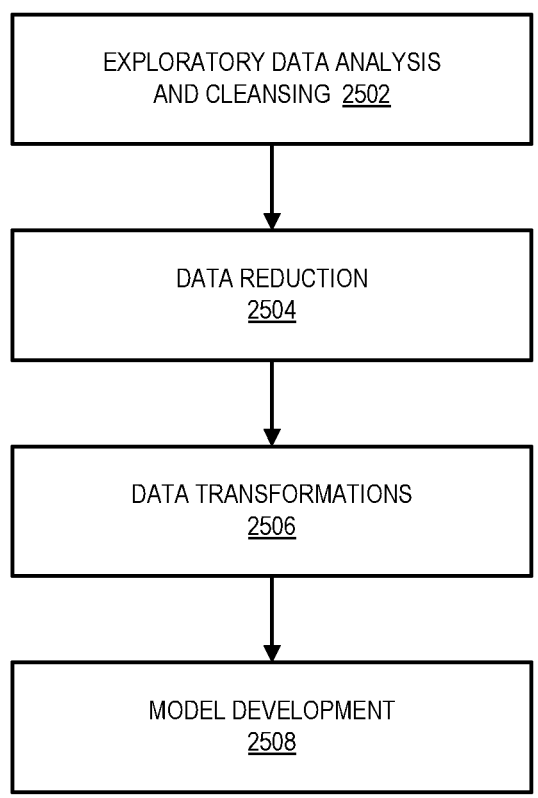
FIG. 25 is a flow chart illustrating how a predictive model might be trained according to some embodiments.

According to some embodiments, the segmentation, assignment, and load balancing engine 2401 uses a predictive model to facilitate a provisioning of claim handlers. Note that the predictive model might be designed and/or trained in a number of different ways. For example, FIG. 25 is a flow chart illustrating how a predictive model might be created according to some embodiments. At 2502, data to be input to the predictive model may be analyzed, scrubbed, and/or cleaned. This process might involve a broad review of the relevant variables that may be included in the sample data. Variables might be examined for the presence of erroneous values, such as incorrect data types or values that don't make sense. Observations with such "noisy" data or missing data may be removed from the sample. Similarly, any data points that represent outliers may also be managed.

At 2504, a data reduction process might be performed. This might occur, for example, between variables in the data sample and/or within specific variables. According to some embodiments, certain variables may be associated with one another and the number of these variables may be reduced. For example, it might be noted that back injuries should not be handled via an expedited workflow process. Within certain variables, the raw values may represent a level of information that is too granular. These raw values might then be categorized to reduce the granularity. A goal of the data reduction process may be to reduce the dimensionality of the data by extracting factors or clusters that may account for the variability in the data.

At 2506, any necessary data transformations may be performed. Transformations of dependent and/or independent variables in statistical models can be useful for improving interpretability, model fit, and/or adherence to modeling assumptions. Some common methods may include normalizations of variables to reduce the potential effects of scale and dummy coding or other numeric transformations of character variables.

Once these steps are complete, the predictive model may be developed at 2508. Depending on the nature of the desired prediction, various modeling techniques may be utilized and compared. The list of independent variables may be narrowed down using statistical methods as well as business judgment. Lastly, the model coefficients and/or weights may be calculated and the model algorithm may be completed. For example, it might be determined that back injuries require a high degree of management (and thus, according to some embodiments, a back injury might be weighted more as compared to a shoulder injury and thus be more likely to end up in a high complexity segment).

Figure 26:
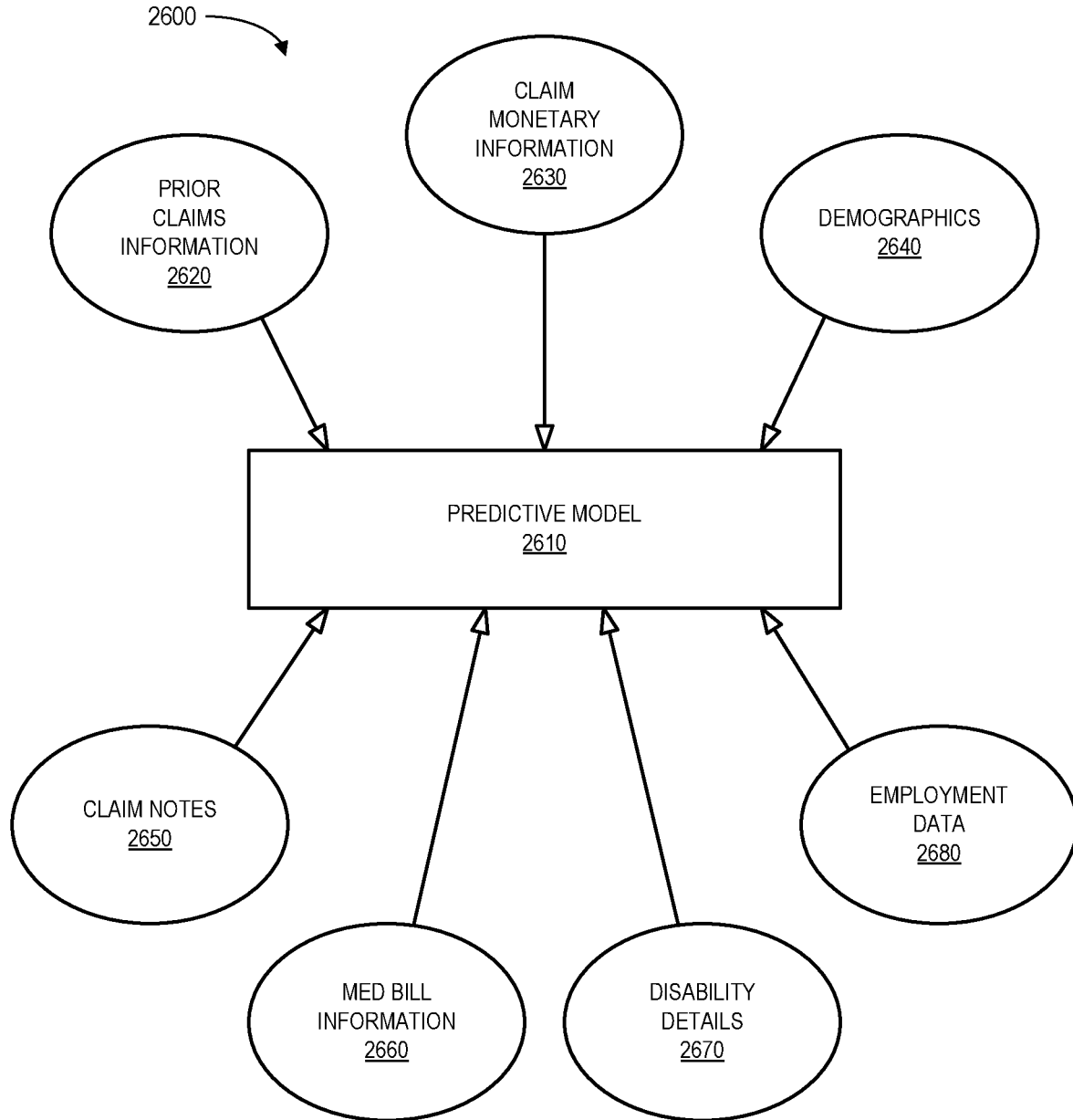
FIG. 26 illustrates predictive model inputs according to some embodiments.

Note that many different types of data might be used to create, evaluate, and/or use a predictive model. For example, FIG. 26 is a block diagram of a system 2600 illustrating inputs to a predictive model 2610 according to some embodiments. In this example, the predictive model 2610 might receive information about prior insurance claims 2620 (e.g., historical data). Moreover, the predictive model 2610 might receive monetary information about claims 2630 (e.g., a total amount of payments made in connection with a claim) and/or demographic information 2640 (e.g., the age or sex of a claimant). According to some embodiments, claim notes 2650 are input to the predictive model 2610 (e.g., and keywords may be extracted from the notes 2650). Other types of information that might be provided to the predictive model 2610 include medical bill information 2660 (e.g., including information about medical care that was provided to a claimant), disability details 2670 (e.g., which part or parts of the body have been injured), and employment data 2680 (e.g., an employee's salary or how long an employee has worked for an employer).

The predictive model 2610, in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to the insurance company. The specific data and outcomes analyzed vary depending on the desired functionality of the particular predictive model 2610. The particular data parameters selected for analysis in the training process are determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text.

Figure 27:
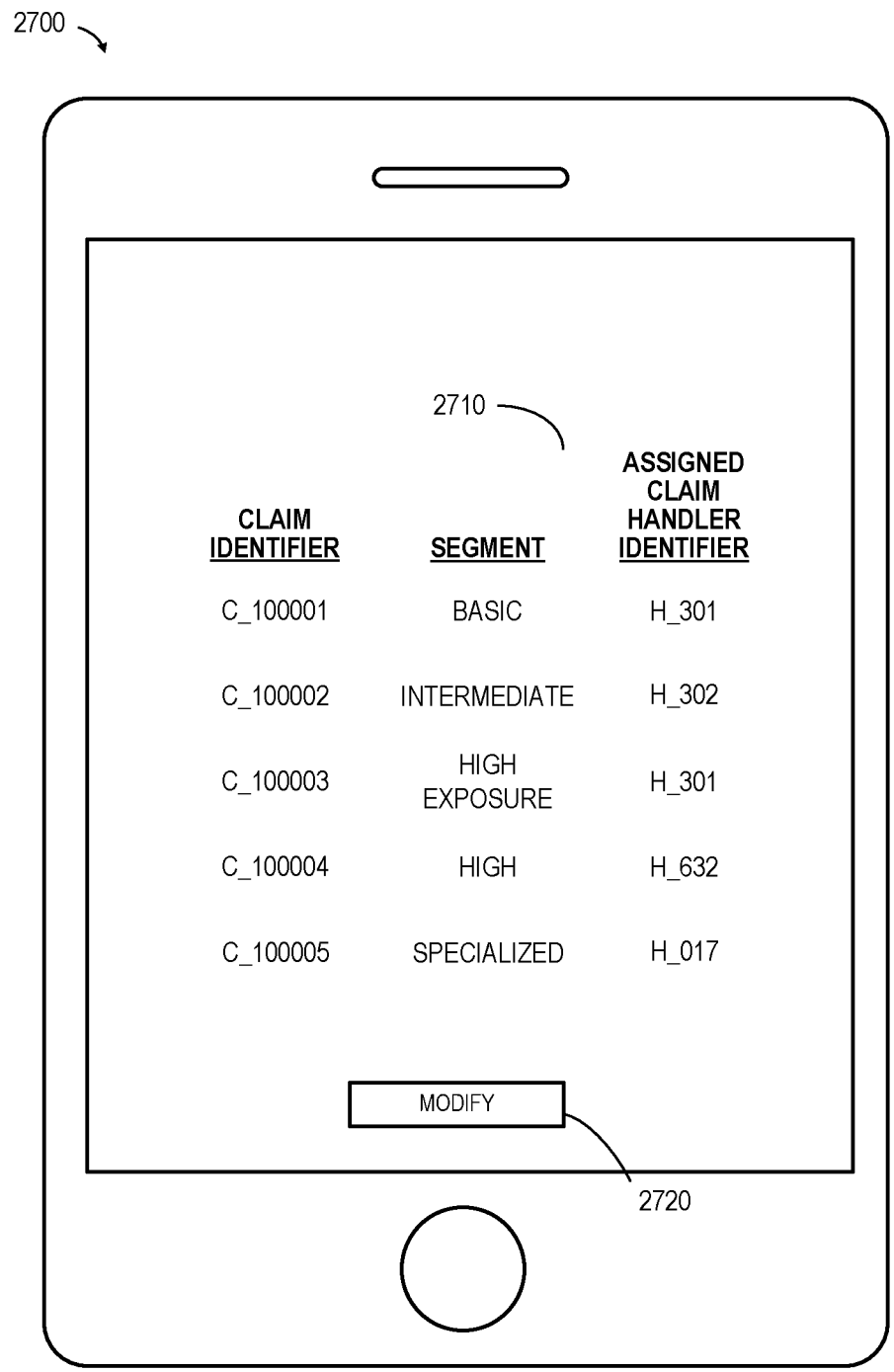
FIG. 27 illustrates a handheld device displaying information about an insurance claim processing system in accordance with some embodiments.

Applicants have discovered that embodiments described herein may be particularly useful in connection with the insurance policies described herein. Note, however, that other types of insurance may also be associated with embodiments described herein. Moreover, the displays 500, 1400 illustrated with respect to FIGS. 5 and 14 are only provided as examples, and embodiments may be associated with any other types of user interfaces. For example, FIG. 27 illustrates a handheld claim segmentation and assignment display 2700 according to some embodiments. In this particular user display 2700, a list of claim handlers 2710 assigned to various insurance claims is provided. Moreover, a user might modify 2720 one or more of the assignments as appropriate.

Note that the present invention provides significant technical improvements to insurance claim segmentation and/or assignments to claim handlers. The present invention is directed to more than merely a computer implementation of a routine or conventional activity previously known in the industry as it significantly advances the technical efficiency, access and/or accuracy of insurance claim segmentation and/or assignments to claim handlers by implementing a specific new method and system as defined herein. The present invention is a specific advancement in the area of insurance claim segmentation and/or assignments to claim handlers by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention tens of thousands insurance claims may be analyzed and automatically assigned to an appropriate claim handler.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computerized system, comprising:
   a data storage device storing data indicative of a plurality of records, the data comprising a plurality of data elements for each of the records;
   one or more first computer processors configured for:
      determining, based on evaluation of the data stored by the data storage device associated with a first record with first segmentation logic, a first segment classification for the first record, the first segment classification being one of a plurality of sequential segment classifications ranked from lowest ranking to highest ranking based on at least one of complexity and potential liability, wherein at least the first segmentation logic comprises a rule mapping at least one parameter description value to a minimum ranking value of the plurality of sequential segment classifications;
      determining, based on evaluation of the data associated with the first record with second segmentation logic different from the first segmentation logic, a second segment classification for the first record, the second segment classification being another one of the plurality of sequential segment classifications, and
      comparing the first segment classification determined based upon the first segmentation logic and the second segment classification determined based upon the second segmentation logic to determine the higher of the first and second segment classifications;
   a configurable parameters database in communication with the one or more first computer processors, the configurable parameters database comprising a plurality of configurable parameters, at least some of the configurable parameters defining rules mapping parameter description values to a parameter value indicative of a ranking value;
   a rules database in communication with the one or more first computer processors, the rules database comprising rules mapping record data items to ranking values; and
   one or more second computer processors configured for:
      selecting a first personnel for assignment to the first record based at least in part on the higher of the first and second sequential segment classifications associated with the first record, and personnel information; the selecting being performed at least in part by a predictive model trained with historical record information, the predictive model including at least one of: (i) a neural network, and (ii) a support vector machine;

receiving, from a human resources computer platform, data indicative of availability of a plurality of personnel, wherein selecting the first personnel for the first record is further based at least in part on the received data indicative of availability of a plurality of personnel; and transmitting an indication of the selected first personnel.

2. The system of claim 1, wherein the records comprise insurance claims submitted in connection with insurance policies.

3. The system of claim 2, wherein the first record is a workers' compensation claim, the first segmentation logic is injury-driven foundation segmentation logic, and the second segmentation logic comprises non-injury driven rules.

4. The system of claim 2, wherein the first one or more computer processors are configured for re-running segmentation logic responsive to an adjustment of one or more selected data elements after a first notice of loss.

5. The system of claim 2, wherein the personnel comprise insurance claim handlers, and selecting a first personnel for assignment to the first record comprises selecting a first claim handler for assignment to a first insurance claim.

6. The system of claim 1, further comprising a personnel database which stores the personnel information, wherein the personnel information comprises one or more of (i) numbers of other records currently assigned to personnel, (ii) load factors associated with personnel, and (iii) expertise attributes associated with personnel.

7. The system of claim 1, wherein the first record comprises at least one of a new record or a previously segmented record having a change in at least one of the plurality of data elements relating to the first record.

8. A computer-implemented method, comprising:
determining, by one or more first computer processors, based on evaluation with first segmentation logic of data stored by a data storage device associated with a first record, a first segment classification for the first record, the first segment classification being one of a plurality of sequential segment classifications ranked from lowest ranking to highest ranking based on at least one of complexity and potential liability, wherein at least the first segmentation logic comprises a rule mapping at least one parameter description value to a minimum ranking value of the plurality of sequential segment classifications, the determining the first segment classification comprising communicating with a configurable parameters database in communication with the one or more first computer processors, the configurable parameters database comprising a plurality of configurable parameters, at least some of the configurable parameters defining rules mapping parameter description values to a parameter value indicative of a segment ranking, and communicating with a rules database in communication with the one or more first computer processors, the rules database comprising rules mapping record data items to ranking values;

determining, by the one or more first computer processors based on evaluation with second segmentation logic different from the first segmentation logic of the data associated with the first record, a second segment classification for the first record, the second segment classification being another one of the plurality of sequential segment classifications, comparing the first segment classification determined based upon the first segmentation logic and the second segment classification determined based upon the second segmentation logic to determine the higher of the first and second segment classifications;

selecting, by one or more second computer processors, a first personnel for assignment to the first record based at least in part on the higher of the first and second sequential segment classifications associated with the first record, and personnel information; the selecting being performed at least in part by a predictive model trained with historical information, the predictive model including at least one of: (i) a neural network, and (ii) a support vector machine;

receiving, from a human resources computer platform, data indicative of availability of a plurality of personnel, wherein selecting the first personnel for the first record is further based at least in part on the received data indicative of availability of a plurality of personnel; and transmitting, by the one or more second computer processors, an indication of the selected first personnel.

9. The computer-implemented method of claim 8, wherein the records comprise insurance claims submitted in connection with insurance policies.

10. The computer-implemented method of claim 9, wherein the first record is a workers' compensation claim, the first segmentation logic is injury-driven foundation segmentation logic, and the second segmentation logic comprises non-injury driven rules.

11. The computer-implemented method of claim 9, further comprising re-running segmentation logic responsive to an adjustment of one or more selected data elements after a first notice of loss.

12. The computer-implemented method of claim 9, wherein the personnel comprise insurance claim handlers, and selecting a first personnel for assignment to the first record comprises selecting a first claim handler for assignment to a first insurance claim.

13. The computer-implemented method of claim 8, wherein the personnel information comprises (i) numbers of other records currently assigned to personnel, (ii) load factors associated with personnel, and (iii) expertise attributes associated with personnel.

14. The computer-implemented method of claim 8, wherein the sequential segment classifications, comprise at least six classifications.

15. The computer-implemented method of claim 8, wherein the first record comprises at least one of a new record or a previously segmented record having a change in at least one of the plurality of data elements relating to the first record.

* * * * *